United States Patent [19]
Hashida

[11] Patent Number: 5,609,400
[45] Date of Patent: Mar. 11, 1997

[54] THREE POSITION SOLENOID CONTROLLED VALVE

[75] Inventor: Koichi Hashida, Itami, Japan

[73] Assignee: Sumitomo Electric Industries, Ltd., Osaka, Japan

[21] Appl. No.: 305,655

[22] Filed: Sep. 14, 1994

[30] Foreign Application Priority Data

Sep. 27, 1993 [JP] Japan .................................... 5-240187

[51] Int. Cl.⁶ ........................................................ B60T 8/00
[52] U.S. Cl. ................... 303/119.2; 137/596.17; 137/627.5; 303/117.1
[58] Field of Search ...................... 137/596.17, 627.5; 303/116.1, 116.2, 117.1, 119.1, 119.2, 84.2

[56] References Cited

U.S. PATENT DOCUMENTS

| | | | |
|---|---|---|---|
| 3,628,571 | 12/1971 | Ostwald et al. | 137/627.5 |
| 3,921,666 | 11/1975 | Leiber | 137/596.17 X |
| 4,304,258 | 12/1981 | Mitchell | 137/596.17 |
| 5,218,996 | 6/1993 | Schmitt-Matzon | 137/596.17 |
| 5,248,191 | 9/1993 | Kondo et al. | 303/117.1 |

FOREIGN PATENT DOCUMENTS

| | | | |
|---|---|---|---|
| 65451 | 11/1982 | European Pat. Off. | 303/119.2 |
| 0110619 | 6/1984 | European Pat. Off. | |
| 0149239 | 7/1985 | European Pat. Off. | |
| 1300748 | 8/1969 | Germany | 137/627.5 |
| 3240272 | 5/1984 | Germany | |
| 3240276 | 5/1984 | Germany | |
| 3240274 | 5/1984 | Germany | |
| 3412351 | 10/1985 | Germany | |
| 4310960 | 10/1993 | Germany | |
| 49-83028 | 8/1974 | Japan | |
| 57-104446 | 6/1982 | Japan | |
| 1443627 | 7/1976 | United Kingdom | |

*Primary Examiner*—Josie Ballato
*Attorney, Agent, or Firm*—Greenblum & Bernstein P.L.C.

[57] ABSTRACT

A three position solenoid controlled valve comprising: a housing having first, second and third ports; first and second valve bodies for bringing the first and second ports into and out of communication with each other and the second and third ports into and out of communication with each other, respectively; first and second urging members for urging the first and second valve bodies in a valve opening direction and a valve closing direction, respectively; an electromagnetic urging device and a movable member which is displaced by the electromagnetic urging device so as to close and open the first and second valve bodies against urging forces of the first and second urging members, respectively such that the first valve body brings the first and second ports out of communication with each other through relative displacement between the housing and the first valve body.

20 Claims, 14 Drawing Sheets

THREE POSITION SOLENOID CONTROLLED VALVE

BACKGROUND OF THE INVENTION

The present invention generally relates to three position solenoid controlled valves and more particularly, to a three position solenoid controlled valve suitably used for a brake fluid pressure control device such as an antiskid brake control device.

Generally, in antiskid control, a pressurizing mode, a holding mode and a depressurizing mode in which liquid pressure of wheel cylinders for wheels of a motor vehicle is increased, held and reduced, respectively are changed over in accordance with skid state of the wheels so as to control liquid pressure of the wheel cylinders.

In order to produce the above mentioned pressurizing mode, the holding mode and the depressurizing mode, a structure is proposed in which an inlet valve formed by a two port and two position solenoid controlled selector valve is provided between a master cylinder of the motor vehicle and each of the wheel cylinders and a discharge valve formed by a two port and two position solenoid controlled selector valve is provided in a return path returning from each of the wheel cylinders to the master cylinder through a reservoir, etc.

On the other hand, a single three position solenoid controlled valve capable of producing these three modes is known. For example, such a single three position solenoid controlled valve is proposed in Japanese Patent Laid-Open Publication No. 49-83028 (1974). In this known three position solenoid controlled valve and illustrated in FIG. 1, a slider 2 is slidably provided in a liquid chamber 1d of a housing 1 having first, second and third ports 1a, 1b and 1c. Meanwhile, an electromagnet 3 is mounted on the housing 1. Valve bodies 4A and 4B are provided in the liquid chamber 1d so as to be movable relative to the slider 2. The slider 2 is urged rightwards in FIG. 1 by a first spring 5, while a second spring 6 is compressed between the valve bodies 4A and 4B. A stopper 7 is slidable relative to the slider 2 and a third spring 8 is compressed between the stopper 7 and the slider 2.

When this three position solenoid controlled valve is used for antiskid control, the first port 1a is connected with the master cylinder, the second port 1b is connected with each of the wheel cylinders and the third port 1c is connected with the return path. Meanwhile, by changing amount of electric power supplied to the electromagnet 3 so as to control urging force (electromagnetic force) applied to the slider 2 by the electromagnet 3, the pressurizing mode, the holding mode and the depressurizing mode are produced.

At the time of deenergization of the electromagnet 3 as shown in FIG. 1, since urging force of the first spring 5 exceeds that of the second spring 6, the valve body 4B opens the first port 1a, while the valve body 4A closes the third port 1c. At this time, the first and second ports 1a and 1b are communicated with each other, thereby resulting in the pressurizing mode of antiskid control.

On the other hand, when the electromagnet 3 is energized so as to apply to the slider 2 a electromagnetic force which is larger than a difference between an urging force of the first spring 5 and that of the second spring 6 but is smaller than a sum of urging forces of the first, second and third springs 5, 6 and 8, the slider 2 is displaced leftwards in FIG. 1, while the valve body 4B closes the first port 1a with a force equal to a difference between a sum of a electromagnetic force of the electromagnet 3 and a leftward urging force of the second spring 6 and a rightward urging force of the first spring 5. Meanwhile, the third port 1c is kept closed by the valve body 4A with a force equal to the urging force of the second spring 6. In this state, the second port 1b is communicated with none of the first and third ports 1a and 1c, thus resulting in the holding mode of antiskid control.

When electromagnetic force of the electromagnet 3 is increased by increasing amount of electric power supplied to the electromagnet 3, the slider 2 overcomes the urging forces of the first, second and third springs 5, 6 and 8 and is further displaced leftwards in FIG. 1. Thus, the valve body 4A opens the third port 1c, while the valve body 4B closes the first port 1a. In this state, the second port 1b is communicated with the third port 1c, thereby resulting in the depressurizing mode of antiskid control.

Electromagnetic force required for opening and closing the first and the third ports 1a and 1c by the valve bodies 4A and 4B through displacement of the slider 2 as described above is associated with the first, second and third springs 5, 6 and 8 but should be actually determined also in view of liquid pressure applied to the first and third ports 1a and 1c.

Initially, in the holding mode, since liquid pressure from the master cylinder is applied to the valve body 4A closing the third port 1c, an electromagnetic force which is equal to a sum of the difference between the urging force of the first spring 5 and that of the second spring 6 and a product of a maximum pressure of the master cylinder and a sealing area of the valve body 4A is required to be applied to the slider 2. Therefore, large electromagnetic force is necessary for maintaining the holding mode.

Meanwhile, in the holding mode, urging force of the third spring 8 should be set relatively large such that liquid pressure of the master cylinder does not cause the valve body 4B to erroneously open the first port 1a. In the depressurizing mode, electromagnetic force exceeding the sum of the urging forces of the first, second and third springs 5, 6 and 8 is necessary as described above. If the urging force of the third spring 8 is set large, electromagnetic force required for producing the depressurizing mode also becomes relatively large.

Thus, in the known three position solenoid controlled valve shown in FIG. 1, since electromagnetic force required for producing the holding mode and the depressurizing mode is relatively large, the electromagnet should be made large in size so as to obtain large electromagnetic force, thereby resulting in increase of size and rise of production cost of the solenoid controlled valve as a whole.

Meanwhile, in the holding mode, electromagnetic force of the electromagnet should fall within a predetermined range. However, as shown in FIG. 2, electromagnetic force P of general electromagnets is substantially proportional to square of electric current I. Therefore, a range $\Delta I_2$ of electric current I, which corresponds to a predetermined range $\Delta P$ of electromagnetic force P when electromagnetic force P is large, becomes considerably small in comparison with a range $\Delta I_1$ of electric current I corresponding to the predetermined range $\Delta P$ of electromagnetic force P when electromagnetic force P is small. Therefore, in order to produce the holding mode in the known three position solenoid controlled valve of FIG. 1, electric current should be controlled highly accurately.

Meanwhile, in the known three position solenoid controlled valve, since magnitude of electromagnetic force is influenced by various factors such as position of the movable members in addition to magnitude of electric current, an electric current controller, components of the solenoid controlled valve, etc. are required to be produced with high dimensional precision.

In order to solve these problems of the known three position solenoid controlled valve, a directional control valve in which force produced by difference in liquid pressure, i.e., force based on liquid pressure is not applied by using a spool is proposed as shown in FIG. 3. In this prior art directional control valve, a spool 12 is slidably provided in a liquid chamber 11d of a housing 11 having first, second and third ports 11a, 11b and 11c. A liquid passage 12a extends axially through the spool 12 and the spool 12 is formed with passages 12b and 12c for communicating the fluid passage 12a with surface of the spool 12. A spring 13 is compressed between the spool 12 and the liquid chamber 11d so as to urge the spool 12 leftwards in FIG. 3 and an electromagnet 14 is provided in the housing 11. In case this prior art directional control valve is used for antiskid control, the first, second and third ports 11a, 11b and 11c are, respectively, connected with the master cylinder, the return path and each of the wheel cylinders.

At the time of deenergization of the electromagnet 14 as shown in FIG. 3, the first and third ports 11a and 11c are communicated with each other via the liquid passage 12a and the passages 12b and 12c, thereby resulting in the pressurizing mode of antiskid control. At this time, since liquid pressure of the master cylinder is applied to opposite ends 12d and 12e of the spool 12, force based on liquid pressure is not produced.

When the electromagnet 14 is energized so as to displace the spool 12 rightwards in FIG. 3 against urging force of the spring 13, communication between the first port 11a and the passage 12b is cut off and the third port 11c is communicated with none of the first and second ports 11a and 11b, thus resulting in the holding mode of antiskid control.

Furthermore, when amount of electric power supplied to the electromagnet 14 is increased so as to displace the spool 12 rightwards in FIG. 3, the passage 12b is communicated with the second port 11b and the second port 11b is communicated with the third port 11c by way of the liquid passage 12a and the passages 12b and 12c, thereby resulting in the depressurizing mode of antiskid control.

In both of the holding mode and the depressurizing mode, liquid pressures applied to the opposite ends 12d and 12e of the spool 12 are identical with each other and thus, no force based on liquid pressure is applied to the spool 12. Therefore, in this prior art directional control valve, electromagnetic force required for producing the holding mode and the depressurizing mode is made smaller than that of the known three position solenoid controlled valve of FIG. 1.

However, since working fluid leaks through a sliding surface S of the spool 12, this prior art directional control valve is not suitable for an antiskid control device in which even slight leakage of working fluid during inoperative period is not permissible.

Meanwhile, in order to solve this problem of the prior art directional control valve, Japanese Patent Laid-Open Publication No. 57-104446 (1982) proposes an antiskid control device including a solenoid controlled valve in which axial force based on liquid pressure is balanced by using a sliding seal. However, in this conventional arrangement employing the sliding seal, since accuracy of pressure balance is not sufficiently high and sliding resistance is produced, it is difficult to put the known antiskid control device to practical use.

SUMMARY OF THE INVENTION

Accordingly, an essential object of the present invention is to provide, with a view to obviating the above described drawbacks of the conventional valves, a compact and inexpensive three position solenoid controlled valve in which magnitude and control accuracy of necessary electromagnetic force can be reduced greatly and leakage of working fluid during nonoperational period can be eliminated.

In order to accomplish this object of the present invention, the present invention provides a three position solenoid controlled valve comprising: a housing which has first, second and third ports; a first valve body which is slid in the housing so as to bring the first and second ports into and out of communication with each other; a first urging means for urging the first valve body in a direction for bringing the first and second ports into communication with each other; a second valve body for bringing the second and third ports into and out of communication with each other; a second urging means for urging the second valve body in a direction for bringing the second and third ports out of communication with each other; an electromagnetic urging means; and a movable member which is displaced, in engagement with the first and second valve bodies, in the housing in a sliding direction of the first valve body by an electromagnetic force of the electromagnetic urging means so as to cause the first and second valve bodies to bring the first and second ports out of communication with each other against an urging force of the first urging means and the second and third ports into communication with each other against an urging force of the second urging means, respectively; wherein when the electromagnetic force of the electromagnetic urging means is set at zero, the urging force of the first urging means causes the first valve body to bring the first and second ports into communication with each other and the urging force of the second urging means causes the second valve body to bring the second and third ports out of communication with each other; wherein when the electromagnetic force of the electromagnetic urging means is set at a first predetermined value, the movable member causes the first valve body to bring the first and second ports out of communication with each other against the urging force of the first urging means and the urging force of the second urging means causes the second valve body to bring the second and third ports out of communication with each other; wherein when the electromagnetic force of the electromagnetic urging means is set at a second predetermined valve larger than the first predetermined value, the movable member causes the first and second valve bodies to bring the first and second ports out of communication with each other against the urging force of the first urging means and the second and third ports into communication with each other against the urging force of the second urging means, respectively; the first valve body or the movable member being formed with a detour for allowing communication of working fluid between opposite ends of the first valve body in the sliding direction of the first valve body regardless of position of the movable member in the housing such that a force based on a liquid pressure applied to one of the opposite ends of the first valve body in the sliding direction of the first valve body from the first and second ports and a force based on a liquid pressure applied to the other of the opposite ends of the first valve body in the sliding direction of the first valve body from the first and second ports eliminate each other; wherein the first valve body is formed by a spool slid in the housing substantially in liquid-tight state and brings the first and second ports out of communication with each other through relative displacement between the housing and a land portion of the first valve body.

Meanwhile, according to a feature of the present invention, a three position solenoid controlled valve is provided comprising: a housing which has first, second and third ports; a first valve body which is slid in the housing so as to bring the first and second ports into and out of communication with each other; a first urging means for urging the first valve body in a direction for bringing the first and second ports into communication with each other; a second valve body for bringing the second and third ports into and out of communication with each other; a second urging means for urging the second valve body in a direction for bringing the second and third ports out of communication with each other; an electromagnetic urging means; a movable member which is displaced, in engagement with the first and second valve bodies, in the housing in a sliding direction of the first valve body by an electromagnetic force of the electromagnetic urging means so as to cause the first and second valve bodies to bring the first and second ports out of communication with each other against an urging force of the first urging means and the second and third ports into communication with each other against the urging force of the second urging means, respectively; wherein when the electromagnetic force of the electromagnetic urging means is set at zero, the urging force of the first urging means causes the first valve body to bring the first and second ports into communication with each other and the urging force of the second urging means causes the second valve body to bring the second and third ports out of communication with each other; wherein when the electromagnetic force of the electromagnetic urging means is set at a first predetermined value, the movable member causes the first valve body to bring the first and second ports out of communication with each other against the urging force of the first urging means and the urging force of the second urging means causes the second valve body to bring the second and third ports out of communication with each other; wherein when the electromagnetic force of the electromagnetic urging means is set at a second predetermined valve larger than the first predetermined value, the movable member causes the first and second valve bodies to bring the first and second ports out of communication with each other against the urging force of the first urging means and the second and third ports into communication with each other against the urging force of the second urging means, respectively; the first valve body or the movable member being formed with a detour for allowing communication of working fluid between opposite ends of the first valve body in the sliding direction of the first valve body regardless of position of the movable member in the housing such that a force based on a liquid pressure applied to one of the opposite ends of the first valve body in the sliding direction of the first valve body from the first and second ports and a force based on a liquid pressure applied to the other of the opposite ends of the first valve body in the sliding direction of the first valve body from the first and second ports eliminate each other; and an annular sealing member which is made of elastic material and is provided on the first valve body or the housing; wherein the first valve body is formed by a spool; wherein when the first valve body has been displaced in a direction for maximizing relative displacement between the housing and a land portion of the first valve body, the sealing member is brought into contact with a seat portion provided on the first valve body or the housing so as to bring the first and second ports out of communication with each other.

Another feature of the instant invention is the provision of a three position solenoid controlled valve in which the first urging means urges the first valve body through the movable member in the direction for bringing the first and second ports into communication with each other and the second urging means is provided between the first and second valve bodies so as to urge the first valve body in a direction for bringing the first and second ports out of communication with each other, wherein the urging force of the first urging means is set to be larger than the urging force of the second urging means such that the first valve body is urged in the direction for bringing the first and second ports into communication with each other.

According to the present invention, a three position solenoid controlled valve comprises a housing which has first, second and third ports; a first valve body for bringing the first and second ports into and out of communication with each other; a first urging means for urging the first valve body in a direction for bringing the first and second ports into communication with each other; a second valve body for bringing the second and third ports into and out of communication with each other; a second urging means for urging the second valve body in a direction for bringing the second and third ports out of communication with each other; a movable member; and an electromagnetic urging means for imparting an electromagnetic force to the movable member; wherein when the electromagnetic force of the electromagnetic urging means is set at zero, an urging force of the first urging means causes the first valve body to bring the first and second ports into communication with each other and an urging force of the second urging means causes the second valve body to bring the second and third ports out of communication with each other; wherein when the electromagnetic force of the electromagnetic urging means is set at a first predetermined value, the movable member causes the first valve body to bring the first and second ports out of communication with each other against the urging force of the first urging means and the urging force of the second urging means causes the second valve body to bring the second and third ports out of communication with each other; wherein when the electromagnetic force of the electromagnetic urging means is set at a second predetermined value larger than the first predetermined value, the movable member causes the first and second valve bodies to bring the first and second ports out of communication with each other against the urging force of the first urging means and the second and third ports into communication with each other against the urging force of the second urging means, respectively; the first valve body or the movable member being formed with a detour for allowing communication of working fluid between opposite ends of the first valve body in a sliding direction of the first valve body regardless of position of the movable member such that a force based on a liquid pressure applied to one of the opposite ends of the first valve body in the sliding direction of the first valve body from the first and second ports and a force based on a liquid pressure applied to the other of the opposite ends of the first valve body in the sliding direction of the first valve body from the first and second ports eliminate each other; wherein the first valve body and the movable member are provided integrally with each other.

In a feature of the instant invention, a three position solenoid controlled valve is provided in which wherein the first valve body is formed by a spool slid in the housing substantially in liquid-tight state and brings the first and second ports out of communication with each other through relative displacement between the housing and a land portion of the first valve body.

In another feature of the instant invention, a three position solenoid controlled valve further comprises an annular sealing member which is made of elastic material and is provided on the first valve body or the housing; wherein the first valve body is formed by a spool slid in the housing; wherein when the first valve body has been displaced in a direction for maximizing relative displacement between the housing and a land portion of the first valve body, the sealing member is brought into contact with a seat portion provided on the first valve body or the housing so as to bring the first and second ports out of communication with each other.

In the three position solenoid controlled valve of the present invention, the detour for allowing communication of working fluid between the opposite ends of the first valve body in the sliding direction of the first valve body is formed on the first valve body or the movable member. Thus, the force based on the liquid pressure applied to one of the opposite ends of the first valve body in the sliding direction of the first valve body from the first and second ports and the force based on the liquid pressure applied to the other of the opposite ends of the first valve body in the sliding direction of the first valve is provided body from the first and second ports eliminate each other regardless of position of the movable member in the housing. Therefore, intermediate energization and full energization of the electromagnetic urging means can be performed by a relatively small electromagnetic force. Accordingly, the amount of electric current supplied to the electromagnetic urging means can be reduced. Since the intermediate energization of the electromagnetic urging means can be performed by the relatively small electromagnetic force as described above, range of value of electric current for maintaining this intermediate energization of the electromagnetic urging means is wide. Furthermore, since the first and second ports are brought out of communication with each other through relative displacement between the housing and the land portion of the first valve body formed by the spool, leakage of working fluid poses substantially no problem for practical use in the case where the three position solenoid controlled valve is applied to an antiskid control device, etc.

In the three position solenoid controlled valve of the present invention, since the detour for allowing communication of working fluid between the opposite ends of the first valve body in the sliding direction of the first valve body is formed on the first valve body or the movable member, the force based on the liquid pressure applied to one of the opposite ends of the first valve body in the sliding direction of the first valve body from the first and second ports and the force based on the liquid pressure applied to the other of the opposite ends of the first valve body in the sliding direction of the first valve body from the first and second ports eliminate each other regardless of position of the movable member in the housing. Therefore, intermediate energization and full energization of the electromagnetic urging means can be performed by a relatively small electromagnetic force and thus, amount of electric current supplied to the electromagnetic urging means can be reduced. Meanwhile, since intermediate energization of the electromagnetic urging means can be performed by the relatively small electromagnetic force as described above, range of value of electric current for maintaining this intermediate energization of the electromagnetic urging means is wide. Furthermore, since the annular sealing member is brought into contact with the seat portion provided on the first valve body or the housing so as to bring the first and second ports out of communication with each other when the first valve body is displaced, leakage of working fluid between the first and second ports can be lessened greatly.

In the three position solenoid controlled valve of the instant invention, since the second urging means is provided between the first and second valve bodies, the three position solenoid controlled valve can be assembled by sequentially fitting the second valve body, the first valve body, the movable member, etc. into the housing, the three position solenoid controlled valve can be assembled easily.

In the three position solenoid controlled valve of the instant invention, since the detour for allowing communication of working fluid between the opposite ends of the first valve body in the sliding direction of the first valve body is formed on the first valve body or the movable member, the force based on the liquid pressure applied to one of the opposite ends of the first valve body in the sliding direction of the first valve body from the first and second ports and the force based on the liquid pressure applied to the other of the opposite ends of the first valve body in the sliding direction of the first valve body from the first and second ports eliminate each other regardless of position of the movable member in the housing. Therefore, intermediate energization and full energization of the electromagnetic urging means can be performed by a relatively small electromagnetic force and thus, amount of electric current supplied to the electromagnetic urging means can be reduced. Meanwhile, since intermediate energization of the electromagnetic urging means can be performed by the relatively small electromagnetic force as described above, range of value of electric current for maintaining this intermediate energization of the electromagnetic urging means is wide. Furthermore, since the first valve body and the movable member are provided integrally with each other, the three position solenoid controlled valve is simplified structurally.

In the three position solenoid controlled valve of the instant invention, since the first and second ports are brought out of communication with each other through relative displacement between the housing and land portion of the first valve body formed by the spool, leakage of working fluid at the time of deenergization of the electromagnetic urging means is substantially eliminated.

In the three position solenoid controlled valve of the instant invention, since the annular sealing member is brought into contact with the seat portion provided on the first valve body or the housing so as to bring the first and second ports out of communication with each other when the first valve body is displaced, leakage of working fluid between the first and second ports can be reduced greatly.

BRIEF DESCRIPTION OF THE DRAWINGS

This object and features of the present invention will become apparent from the following description taken in conjunction with the preferred embodiments thereof with reference to the accompanying drawings, in which.

DETAILED DESCRIPTION OF THE INVENTION

Figure 1:
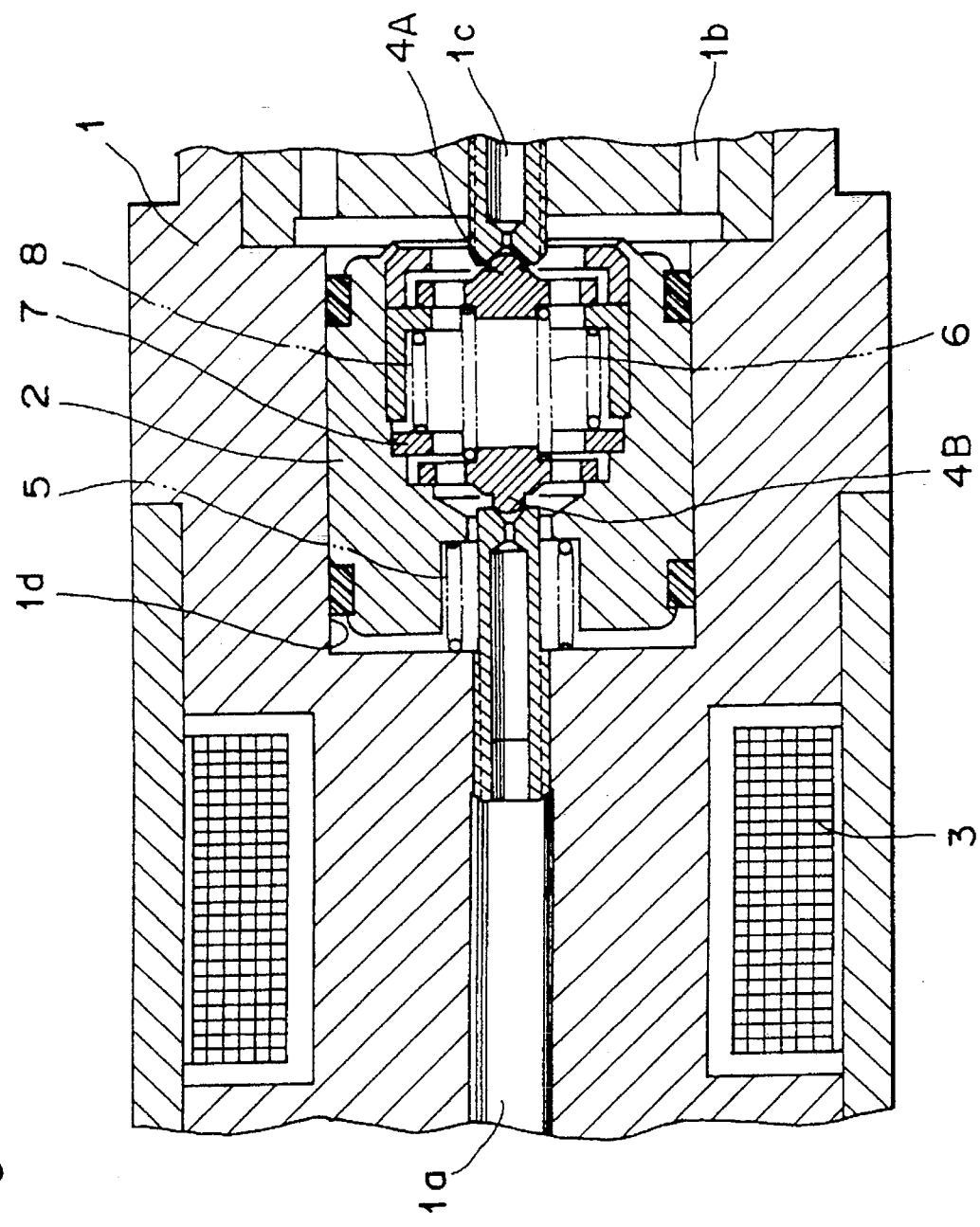
FIG. 1 is a schematic sectional view of a prior art three position solenoid controlled valve (already referred to)
Figure 2:
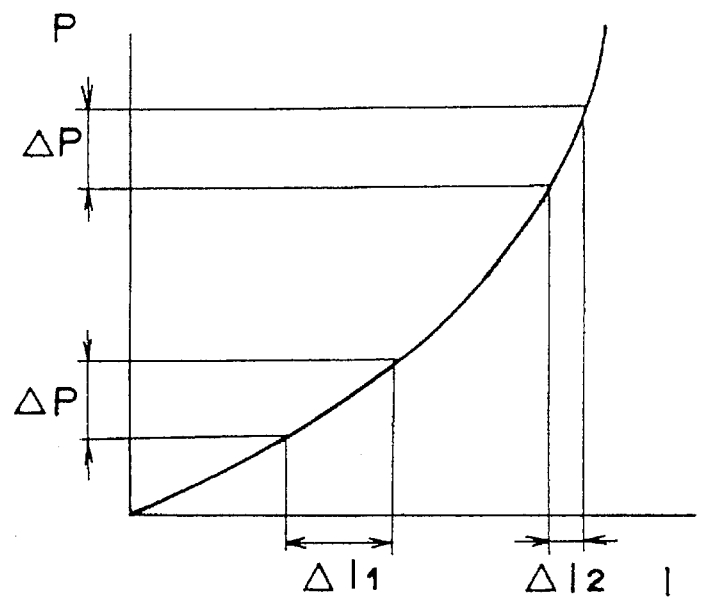
FIG. 2 is a graph showing relation between electric current and electromagnetic force in the prior art three position solenoid controlled valve of FIG. 1 (already referred to)
Figure 3:
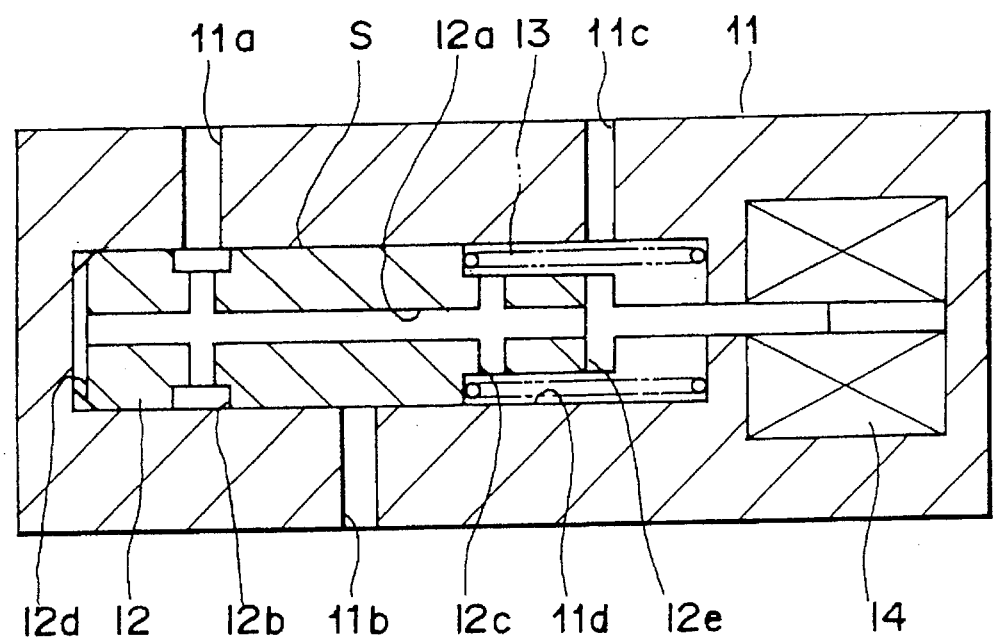
FIG. 3 is a schematic sectional view of a prior art directional control valve including a spool (already referred to)
Figure 4:
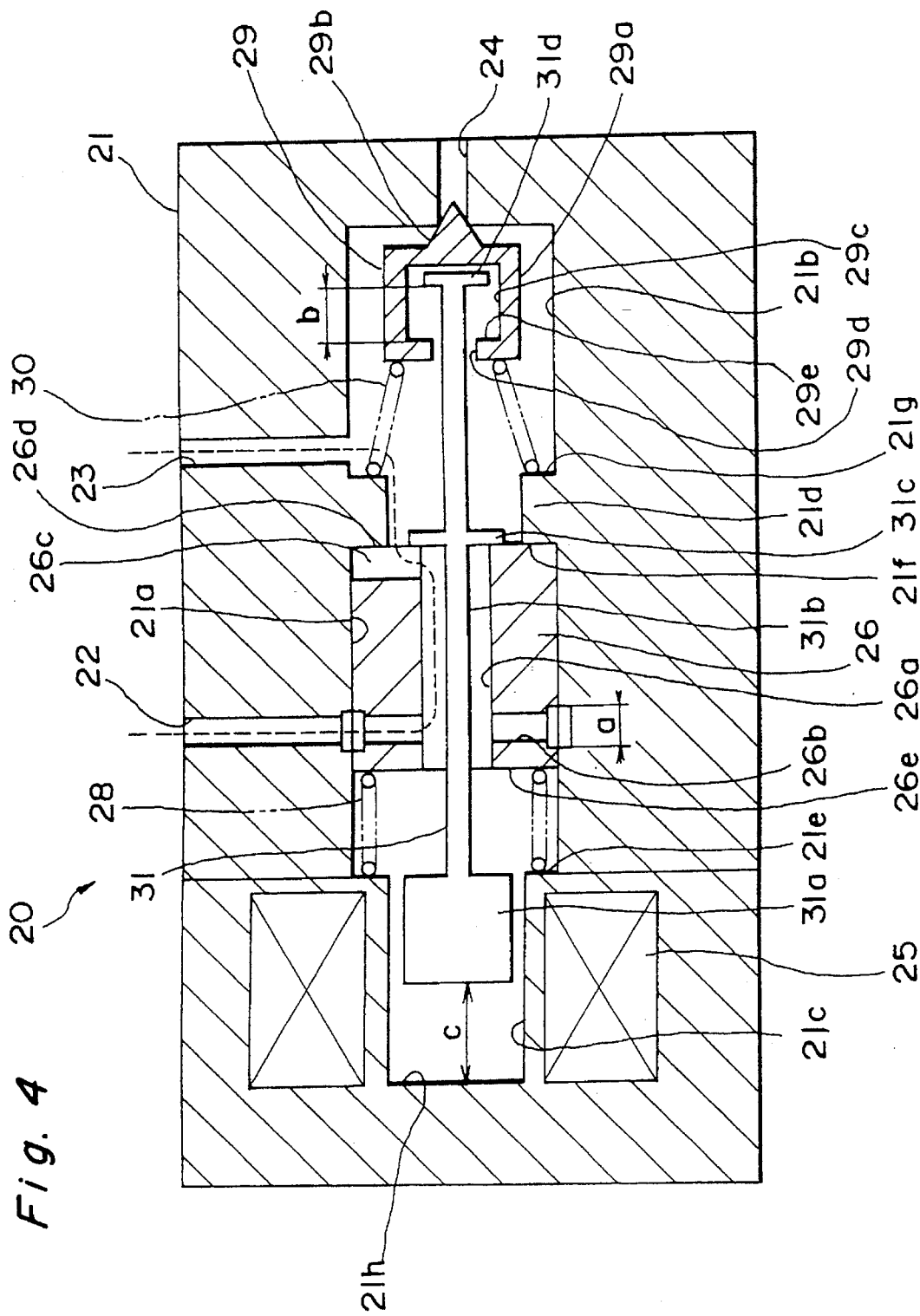
FIG. 4 is a schematic sectional view of a three position solenoid controlled valve according to a first embodiment of the present invention.

Referring now to the drawings, there is shown in FIG. 4, a three position solenoid controlled valve 20 according to a first embodiment of the present invention. A housing 21 of the three position solenoid controlled valve 20 is formed with a first liquid chamber 21a. A second liquid chamber 21b and a third liquid chamber 21c are, respectively, formed at opposite ends of the first liquid chamber 21a so as to axially extend in series. A radially inwardly projecting small diameter portion 21d is provided between the first and second liquid chambers 21a and 21b, while a step portion 21e is provided between the first and third liquid chambers 21a and 21c.

Furthermore, the housing 21 has a radially extending first port 22 communicating with the first liquid chamber 21a, a radially extending second port 23 communicating with the second liquid chamber 21b and an axially extending third port 24 communicating with the second liquid chamber 21b. An electromagnetic urging means 25 including an electromagnet is provided so as to surround the third liquid chamber 21c.

A spool 26 acting as a first valve body is axially slidably provided in the first liquid chamber 21a. A liquid passage 26a axially extends through the spool 26 and a radially extending passage 26b for communicating the liquid passage 26a with outer periphery of the spool 26 is formed on the spool 26. Meanwhile, a right end face 26d of the spool 26 is axially recessed partially so as to form a detour 26c. A first spring 28 is compressed between the spool 26 and the step portion 21e so as to press the spool 26 against an engageable portion 21f which is formed by a left end face of the small diameter portion 21d.

A second valve body 29 for opening and closing the third port 24 is provided in the second liquid chamber 21b. The second valve body 29 includes a hollow frame 29a and a conical portion 29b for closing the third port 24. The conical portion 29b is provided at a distal end of the frame 29a. The frame 29a has an inner hollow 29c and an opening 29d communicating with the inner hollow 29c. Periphery of the opening 29d forms an engageable portion 29e engageable with a second engageable portion 31d of a movable member 31 to be described later. A second spring 30 is compressed between the second valve body 29 and a spring support 21g which is formed by a right end face of the small diameter portion 21d so as to urge the second valve body 29 in a direction for closing the third port 24.

The movable member 31 is urged by the electromagnetic urging means 25 and includes a main body 31a disposed in the third liquid chamber 21c and a rod portion 31b protruding from the main body 31a. The rod portion 31b is loosely inserted into the liquid passage 26a of the spool 26 and extends into the inner hollow 29c of the frame 29a of the second valve body 29. A first engageable portion 31c of disklike shape is provided at a portion of the rod portion 31b corresponding to the small diameter portion 21d and is brought into contact with the right end face 26d of the spool 26. The second engageable portion 31d of disklike shape is provided at a distal end of the rod portion 31b.

In the three position solenoid controlled valve 20, assuming that character a denotes a travel stroke of the spool 26 for bringing the first port 22 and the passage 26b out of communication with each other, i.e., a travel stroke of the spool 26 for closing the first port 22, character b denotes a distance between the second engageable portion 31d and the engageable portion 29e of the second valve body 29, i.e., a distance for setting the second valve body 29 to inoperative state and character c denotes a distance between the main body 31a of the movable member 31 and an end face 21h of the third liquid chamber 21c, i.e., a maximum travel stroke of the movable member 31, the dimension a, b and c are set so as to satisfy the relation of (a<b<c).

Then, operational features of the three position solenoid controlled valve 20 are described. Initially, when electric current is not supplied to the electromagnetic urging means 25 so as not to apply electromagnetic urging force to the movable member 31, i.e., at the time of deenergization of the electromagnetic urging means 25, the movable member 31, the spool 26 and the second valve body 29 are disposed as shown in FIG. 4. Namely, at the time of deenergization of the electromagnetic urging means 25, the spool 26 is engaged with the engageable portion 21f by urging force of the first spring 28 and the first port 22 is communicated with the passage 26b of the spool 26. On the other hand, the second valve body 29 is urged rightwards in FIG. 4 by the second spring 30 such that the conical portion 29b closes the third port 24. Accordingly, at the time of deenergization of the electromagnetic urging means 25, a flow path proceeding from the first port 22 to the second port 23 through the passage 26b, the liquid passage 26a, the detour 26c and the second liquid chamber 21b is formed as shown by the broken line in FIG. 4.

Figure 5:
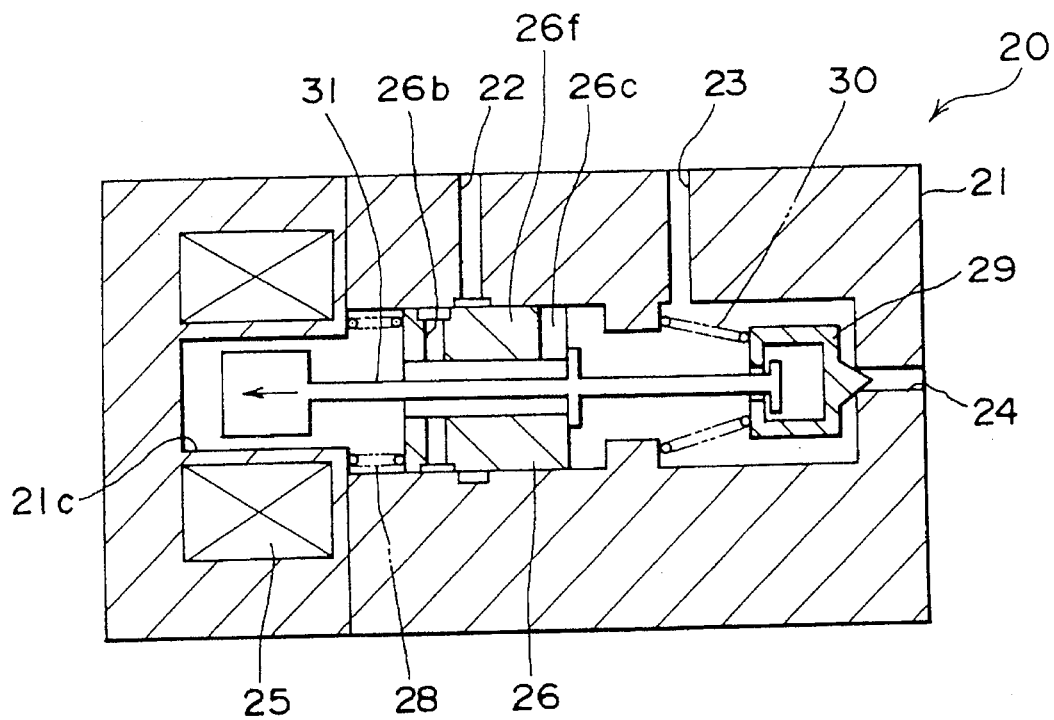
FIGS. 5 and 6 are schematic sectional views showing an intermediate energization state and a full energization state of the three position solenoid controlled valve of FIG. 4, respectively.

Then, when an intermediate electromagnetic force is applied to the movable member 31 by the electromagnetic urging means 25 by supplying electric current to the electromagnetic urging means 25, i.e., at the time of intermediate energization of the electromagnetic urging means 25, the movable member 31, the spool 26 and the second valve body 29 are disposed as shown in FIG. 5. Namely, at the time of intermediate energization of the electromagnetic urging means 25, since leftward electromagnetic force is applied to the movable member 31 by the electromagnetic urging means 25, the movable member 31 is displaced leftwards together with the spool 26 through engagement of the first engageable portion 31c with the spool 26. By this displacement of the spool 26, the first port 22 and the passage 26b are brought out of communication with each other and thus, the first port 22 is closed by a land portion 26f of the spool 26. On the other hand, the distance b for setting the second valve body 29 to inoperative state is set to be larger than the travel stroke a of the spool 26 for closing the first port 22 as described above. Therefore, even if the first port 22 is closed, the second engageable portion 31d of the movable member 31 is held out of contact with the engageable portion 29e of the second valve body 29, so that the third port 24 is still closed by the second valve body 29. Thus, at the time of intermediate energization of the electromagnetic urging means 25, the second port 23 is communicated with none of the first and third ports 22 and 24.

Figure 6:
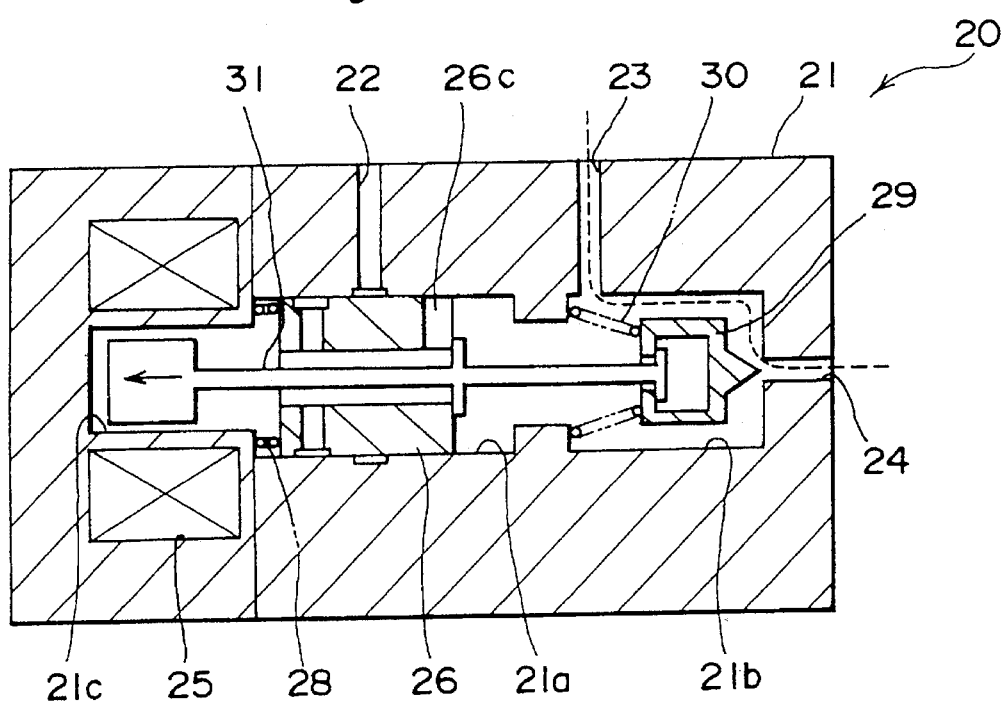

Subsequently, when a large electromagnetic force larger than the above intermediate electromagnetic force is applied to the movable member 31 by the electromagnetic urging means 25 by supplying a large amount of electric current to the electromagnetic urging means 25, i.e., at the time of full energization of the electromagnetic urging means 25, the movable member 31, the spool 26 and the second valve body 29 are disposed as shown in FIG. 6. Namely, at the time of full energization of the electromagnetic urging means 25, the movable member 31 is displaced further leftwards than at the time of intermediate energization of the electromagnetic urging means 25 and thus, the spool 26 held in engagement with the first engageable portion 31c of the movable member 31 is further displaced leftwards accordingly. Meanwhile, when travel stroke of the movable member 31 exceeds the distance b for setting the second valve body 29 to inoperative state, the second engageable portion 31d of the movable member 31 is brought into engagement with the engageable portion 29e of the frame 29a, so that the second valve body 29 is also displaced leftwards together with the movable member 31 and thus, the conical portion 29b is released from the third port 24. As a result, the third port 24 is opened. Accordingly, at the time of full energization of the electromagnetic urging means 25, the second port 23 is communicated with the third port 24 through the second liquid chamber 21b.

The three position solenoid controlled valve 20 has the detour 26c. Therefore, at the time of deenergization of the electromagnetic urging means 25 as shown in FIG. 4, liquid pressure applied to a left end face 26e of the spool 26 from the first and second ports 22 and 23 and liquid pressure applied to the right end face 26d of the spool 26 from the first and second ports 22 and 23 eliminate each other and thus, force based on liquid pressure is not produced. Therefore, if urging force of the first spring 28 is set at a value for overcoming small sliding resistance produced during sliding of the spool 26, the spool 26 can be fixed at a predetermined position at the time of deenergization of the electromagnetic urging means 25. Accordingly, in the three position solenoid controlled valve 20, urging force of the first spring 28 can be set at a small value.

Meanwhile, also at the time of intermediate energization of the electromagnetic urging means 25 in the three position solenoid controlled valve 20 as shown in FIG. 5, liquid pressures applied to the right and left end faces 26d and 26e of the spool 26 from the second port 23 eliminate each other and thus, force based on liquid pressure is not produced. Thus, in order to keep the first and third ports 22 and 24 closed at the time of intermediate energization of the electromagnetic urging means 25, minimum electromagnetic force should overcome urging force of the first spring 28. Since urging force of the first spring 28 is small as described above, the minimum electromagnetic force is quite small. At the time of intermediate energization of the electromagnetic urging means 25, maximum electromagnetic force for keeping the first and third ports 22 and 24 closed is equal to a sum of urging forces of the first and second springs 28 and 30. However, since urging force of the first spring 28 is considerably small, difference between the maximum electromagnetic force and the minimum electromagnetic force can be increased by setting urging force of the second spring 30 at a relatively large value. Thus, at the time of intermediate energization of the electromagnetic urging means 25 in the three position solenoid controlled valve 20, electromagnetic force for keeping the first and third ports 22 and 24 closed is small but can have a wide range.

Furthermore, at the time of full energization of the electromagnetic urging means 25, electromagnetic force exceeding a sum of urging forces of the first and second springs 28 and 30 and a maximum liquid pressure applied to the second valve body 29 from the third port 24 should be applied to the movable member 31. However, since urging force of the first spring 28 is small as described above, electromagnetic force required at the time of full energization of the electromagnetic urging means 25 is also relatively small.

Figure 7:
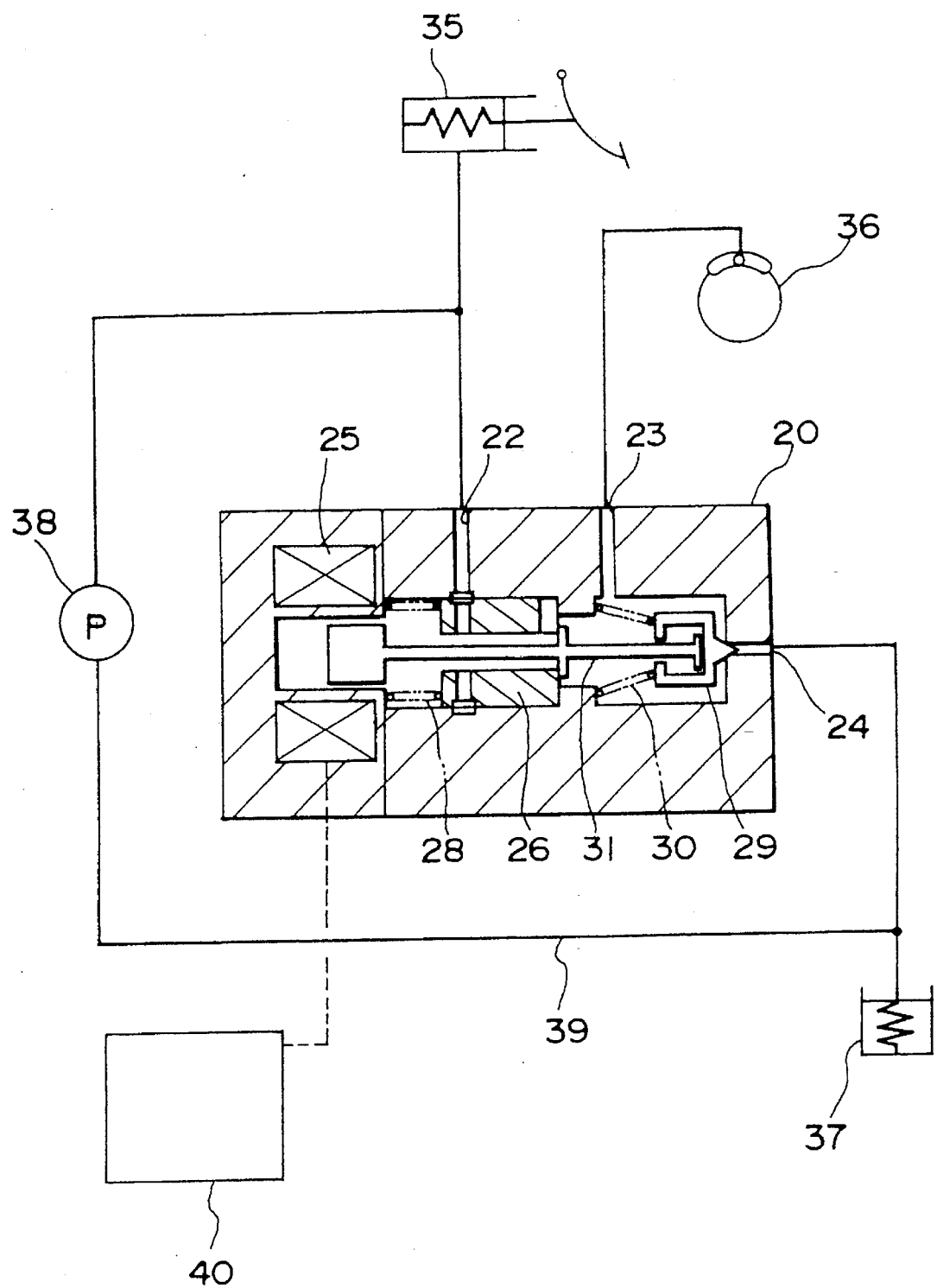
FIG. 7 is a schematic view showing one example in which the three position solenoid controlled valve of FIG. 4 is applied to an antiskid control device.

FIG. 7 shows one example in which the three position solenoid controlled valve 20 is applied to an antiskid control device. In this antiskid control device, a master cylinder 35 is connected with the first port 22 and a wheel cylinder 36 is connected with the second port 23. Meanwhile, the third port 24 is connected with a return path 39 returning to the master cylinder 35 through a reservoir 37 and a pump 38. Furthermore, the electromagnetic urging means 25 receives electric current from a controller 40 which judges a pressurizing mode, a holding mode and a depressurizing mode of antiskid control on the basis of signals from wheel speed sensors (not shown), etc.

Initially, at the time of deenergization of the electromagnetic urging means 25, the first and second ports 22 and 23 are communicated with each other and the third port 24 is closed as described above. Therefore, the master cylinder 35 and the wheel cylinder 36 is communicated with each other, while the return path 39 is shut off, thus resulting in the pressurizing mode.

Meanwhile, at the time of intermediate energization of the electromagnetic urging means 25, the second port 23 is communicated with none of the first and third ports 22 and 24 as described above, thereby resulting in the holding mode in which liquid pressure of the wheel cylinder 36 is maintained. In the three position solenoid controlled valve 20, electromagnetic force for maintaining a state in which the second port 23 is communicated with none of the first and third ports 22 and 24 is small but can have a wide range. Therefore, value of electric current supplied from the controller 40 can be lessened and is not required to be controlled at high precision.

Furthermore, at the time of full energization of the electromagnetic urging means 25, the first port 22 is closed and the third port 24 is opened so as to be communicated with the second port 23, thus resulting in the depressurizing mode in which the wheel cylinder 36 is connected with the return path 39. Since electromagnetic force for closing the first port 22 and opening the third port 24 is small as described above, value of electric current supplied from the controller 40 can be reduced.

In the three position solenoid controlled valve 20, since the third port 24 is closed by the second valve body 29 urged by the second spring 30, working fluid does not leak from the third port 24. Therefore, in the antiskid control device of FIG. 7, working fluid does not leak from the third port 24 in the pressurizing mode in which the third port 24 is closed. Meanwhile, at the time of intermediate energization (holding mode) and full energization (depressurizing mode) of the electromagnetic urging means 25, working fluid may slightly leak from the first port 22 closed by the spool 26. However, since the depressurizing mode and the holding mode are in the course of antiskid control and are generated in a state where liquid pressure of the second port 23 connected with the wheel cylinder 36 changes greatly, the leakage of working fluid offers substantially no problem to antiskid control.

Figure 8:
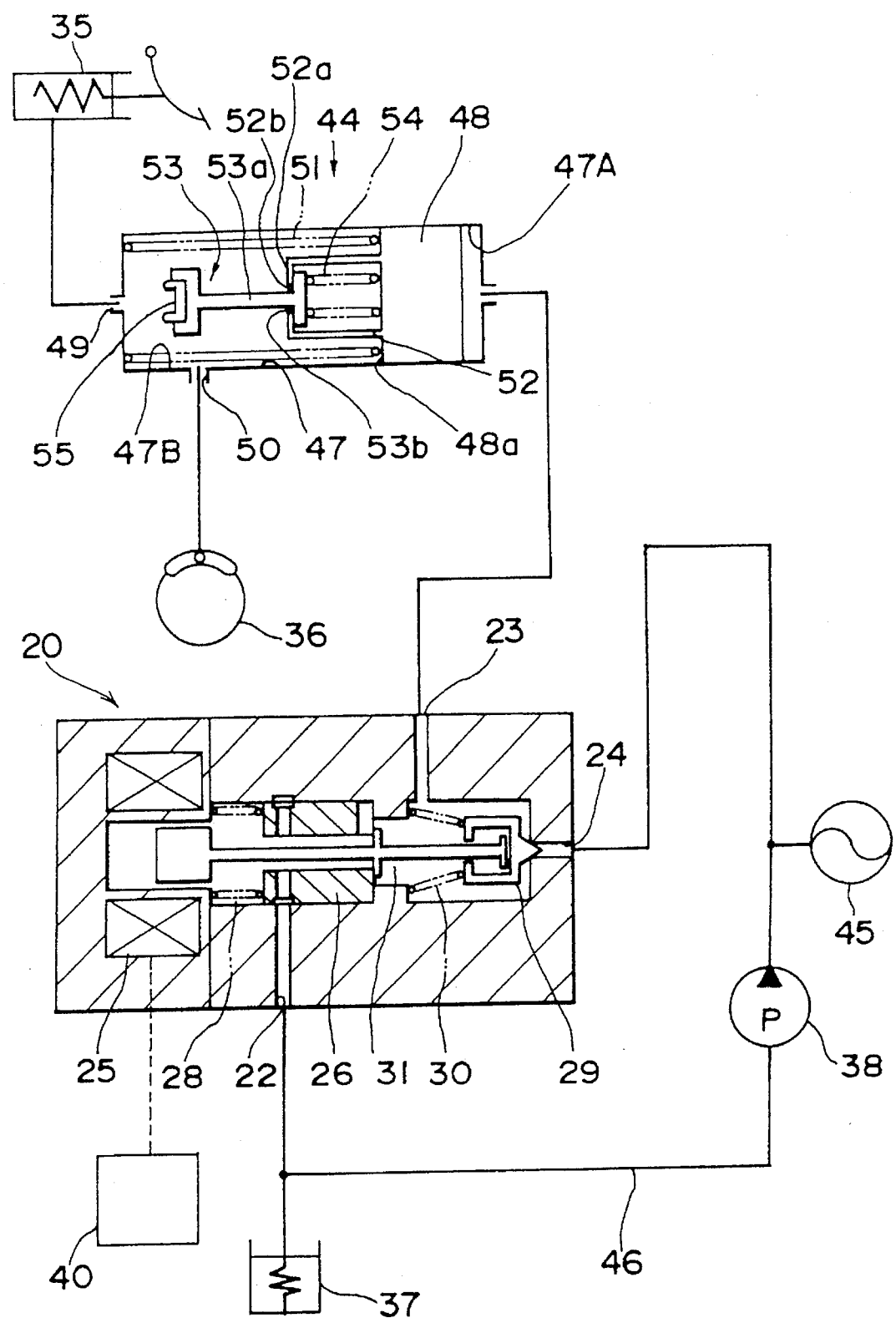
FIG. 8 is a schematic view showing one example in which the three position solenoid controlled valve of FIG. 4 is applied to a traction control device.

FIG. 8 shows one example in which the three position solenoid controlled valve 20 is applied to a traction control device. This traction control device is of a type for indirectly adjusting liquid pressure of the wheel cylinder and includes a booster 44. The third port 24 of the three position solenoid controlled valve 20 is connected with an accumulator 45 for storing high-pressure working fluid, while the second port 23 is coupled with a first portion 47A of the booster 45. Furthermore, the first port 22 is connected with a return path 46 leading to the accumulator 45 via the reservoir 37 and the pump 38.

A liquid chamber 47 of the booster 44 is divided into the first portion 47A and a second portion 47B in liquid-tight state by a piston 48 slidably fitted into the liquid chamber 47. As described above, the first portion 47A is connected with the second port 23 of the three position solenoid controlled valve 20. The second portion 47B has a first port 49 connected with the master cylinder 35 and a second port 50 connected with the wheel cylinder 36. Furthermore, a first spring 51 is compressed in the second portion 47B.

A hollow cage 52 is integrally provided on a left end face 48a of the piston 48 and an opening 52b is formed at the center of an end portion 52a of the cage 52. A large-diameter spring support 53b provided at one end of a rod portion 53a of a valve body 53 is disposed in the cage 52 and a second spring 54 is compressed between the spring support 53b and the left end face 48a of the piston 48. The rod portion 53a projects out of the cage 52 from the opening 52b and a sealing member 55 is attached to the other end of the rod portion 53a.

At the time of deenergization of the electromagnetic urging means 25, since the third port 24 is closed, the high-pressure working fluid of the accumulator 45 is not supplied to the booster 44, thereby resulting in a state not subjected to traction control.

At the time of full energization of the electromagnetic urging means 25, since the second and third ports 23 and 24 are communicated with each other, the high-pressure working fluid of the accumulator 45 is supplied to the first portion 47A of the booster 44 through the second liquid chamber 21b of the three position solenoid controlled valve 20. Thus, the piston 48 is displaced leftwards such that the sealing member 55 closes the first port 49. When pressure in the first portion 47A rises further, volume of the second portion 47B is reduced in response to displacement of the piston 48, so that working fluid is supplied to the wheel cylinder 36. As a result, regardless of operation of the master cylinder 35, liquid pressure of the wheel cylinder 36 is raised such that traction control is performed.

When intermediate energization of the electromagnetic urging means 25 is performed after full energization of the electromagnetic urging means 25, the third port 24 is closed and thus, inflow of the working fluid from the accumulator 45 is stopped. On the other hand, since the first port 22 is also closed, working fluid in the first portion 47A of the booster 44 is not discharged and thus, liquid pressure of the wheel cylinder 36 is maintained.

In the traction control device of FIG. 8, since the third port 24 of the three position solenoid controlled valve 20 is closed by the second valve body 29 urged by the second spring 30, it is possible to prevent the high-pressure working fluid in the accumulator 45 from leaking from the third port 24 in the state not subjected to traction control.

Figure 9:
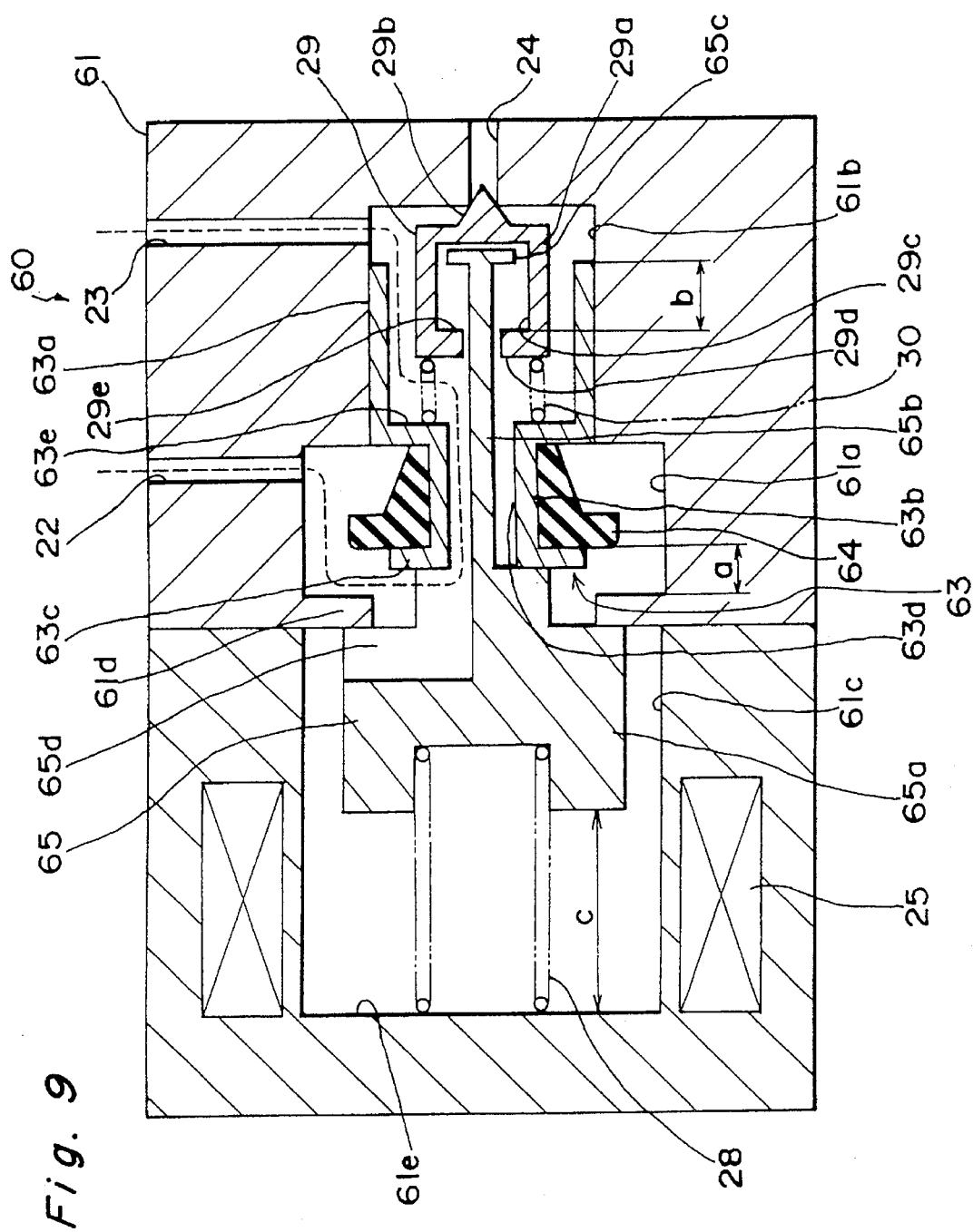
FIG. 9 is a schematic sectional view of a three position solenoid controlled valve according to a second embodiment of the present invention.
Figure 10:
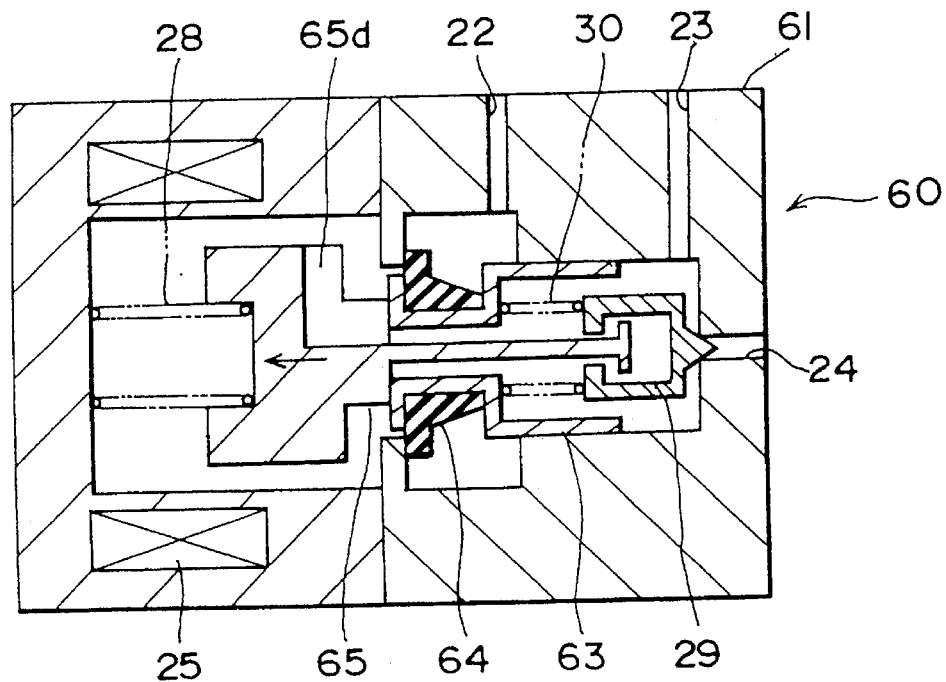
FIGS. 10 and 11 are schematic sectional views showing an intermediate energization state and a full energization state of the three position solenoid controlled valve of FIG. 9, respectively.
Figure 11:
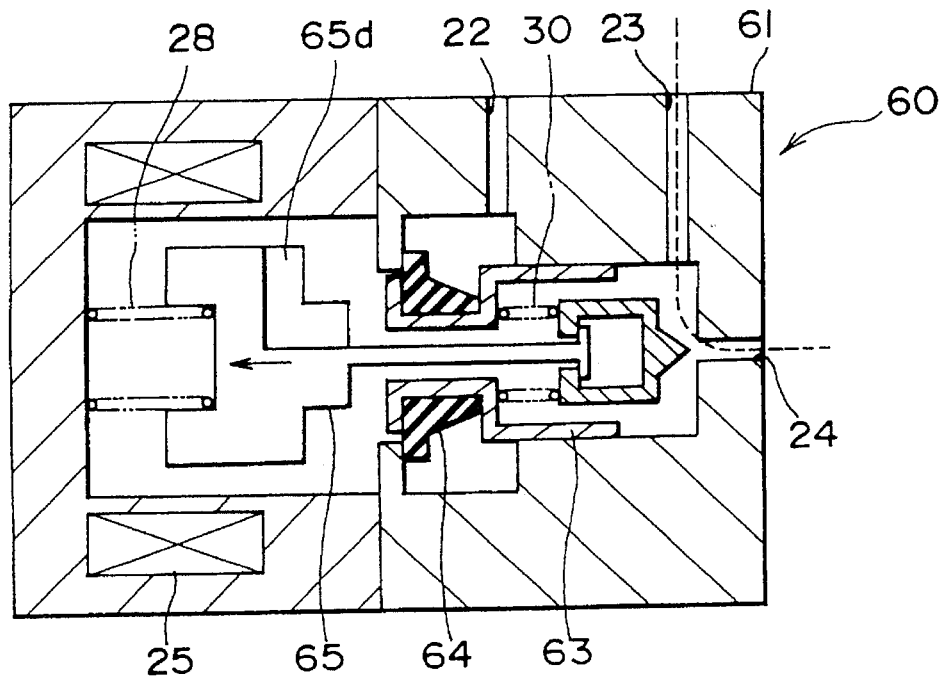

FIGS. 9 to 11 show a three position solenoid controlled valve 60 according to a second embodiment of the present invention. A housing 61 of the three position solenoid controlled valve 60 is formed with a first liquid chamber 61a. A second liquid chamber 61b and a third liquid chamber 61c are, respectively, formed at opposite ends of the first liquid chamber 61a so as to axially extend in series. A radially inwardly extending seat portion 61d is provided between the first and third liquid chambers 61a and 61c. Inside diameter of the seat portion 61d is set to be equal to diameter of the second liquid chamber 61b. Furthermore, the housing 61 has the radially extending first port 22 communicating with the first liquid chamber 61a, the radially extending second port 23 communicating with the second liquid chamber 61b and the axially extending third port 24 communicating with the second liquid chamber 61b.

A spool 63 includes a large-diameter portion 63a, a small-diameter portion 63b and a flange portion 63c and a liquid passage 63d axially extends through the spool 63. The large-diameter portion 63a is brought into sliding contact with peripheral surface of the second liquid chamber 61b, while the small-diameter portion 63b and the flange portion 63c are loosely inserted into the first liquid chamber 61a. An annular sealing member 64 made of elastic material such as rubber is fitted around the small-diameter portion 63b so as to be axially retained between the flange portion 63c and the large-diameter portion 63a.

A movable member 65 includes a main body 65a and a rod portion 65b projecting from the main body 65a. The rod portion 65b is loosely inserted through the liquid passage 63d of the spool 63 so as to extend into the inner hollow 29c of the second valve body 29. A disklike engageable portion 65c is provided at a distal end of the rod portion 65b. A right end face of the movable member 65 is axially recessed partially so as to form a detour 65d. Furthermore, the first spring 28 is compressed between the main body 65a of the movable member 65 and an end face 61e of the third liquid chamber 61c so as to urge the movable member 65 rightwards in FIG. 9.

In the three position solenoid controlled valve 60, the second spring 30 is compressed between the second valve body 29 and a spring support 63e formed at a joint portion between the large-diameter portion 63a and the small-diameter portion 63b of the spool 63. Therefore, in the three position solenoid controlled valve 60, the second spring 30 not only urges the second valve body 29 in a direction for closing the third port 24 but urges the spool 63 in a direction for bringing the sealing member 64 into contact with the seat portion 61d. However, since urging force of the first spring 28 is set to be larger than that of the second spring 30, the spool 63 is held at the position shown in FIG. 9 at the time of deenergization of the electromagnetic urging means 25.

Then, operation of the three position solenoid controlled valve 60 is described. Initially, at the time of deenergization of the electromagnetic urging means 25, the movable member 65, the spool 63 and the second valve body 29 are disposed as shown in FIG. 9. When the spool 63 is disposed at the position shown in FIG. 9, the sealing member 64 is not brought into contact with the seat portion 61d and the first port 22 is communicated with the second port 23 via the first liquid chamber 61a, the detour 65d, the liquid passage 63d and the second liquid chamber 61b as shown by the broken line in FIG. 9. At this time, since the third port 24 is closed by the second valve body 29 but the second valve body 29 is pressed against the third port 24 by urging force of the second spring 30, working fluid does not leak from the third port 24.

At the time of intermediate energization of the electromagnetic urging means 25, the movable member 65, the spool 63 and the second valve body 29 are disposed as shown in FIG. 10. Namely, when the movable member 65 is displaced leftwards by electromagnetic force at the time of intermediate energization of the electromagnetic urging means 25, the spool 63 is also displaced leftwards by urging force of the second spring 30, so that the sealing member 64 is pressed against the seat portion 61d and thus, communication between the first and third liquid chambers 61a and 61c is cut off. Meanwhile, since the large-diameter portion 63a of the spool 63 is brought into sliding contact with peripheral surface of the second liquid chamber 61b, communication between the first and second liquid chambers 61a and 61b is cut off. Thus, at the time of intermediate energization of the electromagnetic urging means 25, the first liquid chamber 61a is intercepted from the second and third liquid chambers 61b and 61c and the first port 22 is intercepted from the second and third ports 23 and 24. Furthermore, at the time of intermediate energization of the electromagnetic urging means 25, the third port 24 is closed by the second valve body 29 urged by the second spring 30.

Then, at the time of full energization of the electromagnetic urging means 25, the movable member 65, the spool 63 and the second valve body 29 are disposed as shown in FIG. 11. Namely, at the time of full energization of the electromagnetic urging means 25, the movable member 65 is displaced further leftwards than at the time of intermediate energization of the electromagnetic urging means 25. Hence, the engageable portion 65c of the movable member 65 is brought into engagement with the engageable portion 29e of the second valve body 29, so that the second valve body 29 is displaced leftwards together with the movable member 65 and thus, the third port 24 is opened by the second valve body 29. On the other hand, since the sealing member 64 is held in contact with the seat portion 61d, the first port 22 is kept closed. Therefore, at the time of full energization of the electromagnetic urging means 25, the second and third ports 23 and 24 are communicated with each other through the second liquid chamber 61b as shown by the broken line in FIG. 11.

In the three position solenoid controlled valve 60, since the detour 65d is formed on the main body 65a of the movable member 65, identical liquid pressure is applied to opposite end faces of the spool 63 at the time of full energization of the electromagnetic urging means 25. Meanwhile, at the time of intermediate energization and full energization of the electromagnetic urging means 25 in which the sealing member 64 is held in contact with the seat portion 61d, since inside diameter of the seat portion 61d is set to be equal to diameter of the second liquid chamber 61b as described above, liquid pressures applied to the opposite end faces of the spool 63 are identical with each other and eliminate each other. Therefore, in the same manner as the first embodiment, amount of electric current required for intermediate energization and full energization of the electromagnetic urging means 25 can be reduced and range of electric current in which the first and third ports 22 and 24 are kept closed in the intermediate energization state of the electromagnetic urging means 25 can be set widely.

Meanwhile, in the second embodiment, since communication between the first and second ports 22 and 23 is cut off by bringing the sealing member 64 into contact with the seat portion 61d, leakage of working fluid from the first port 22 at the time of intermediate energization and full energization of the electromagnetic urging means 25 can be prevented more positively.

In the same manner as FIGS. 7 and 8 of the three position solenoid controlled valve 20 of the first embodiment, the three position solenoid controlled valve 60 of the second embodiment can be applied to an antiskid control device and a traction control device.

Meanwhile, in the second embodiment, since the second spring 30 is compressed between the second valve body 29 and the spool 63 in contrast with the first embodiment, the three position solenoid controlled valve 60 can be assembled by sequentially disposing the second valve body 29, the second spring 30 and the spool 63 in the housing 61, thereby resulting in facilitation of assembly of the three position solenoid controlled valve 60.

Figure 12:
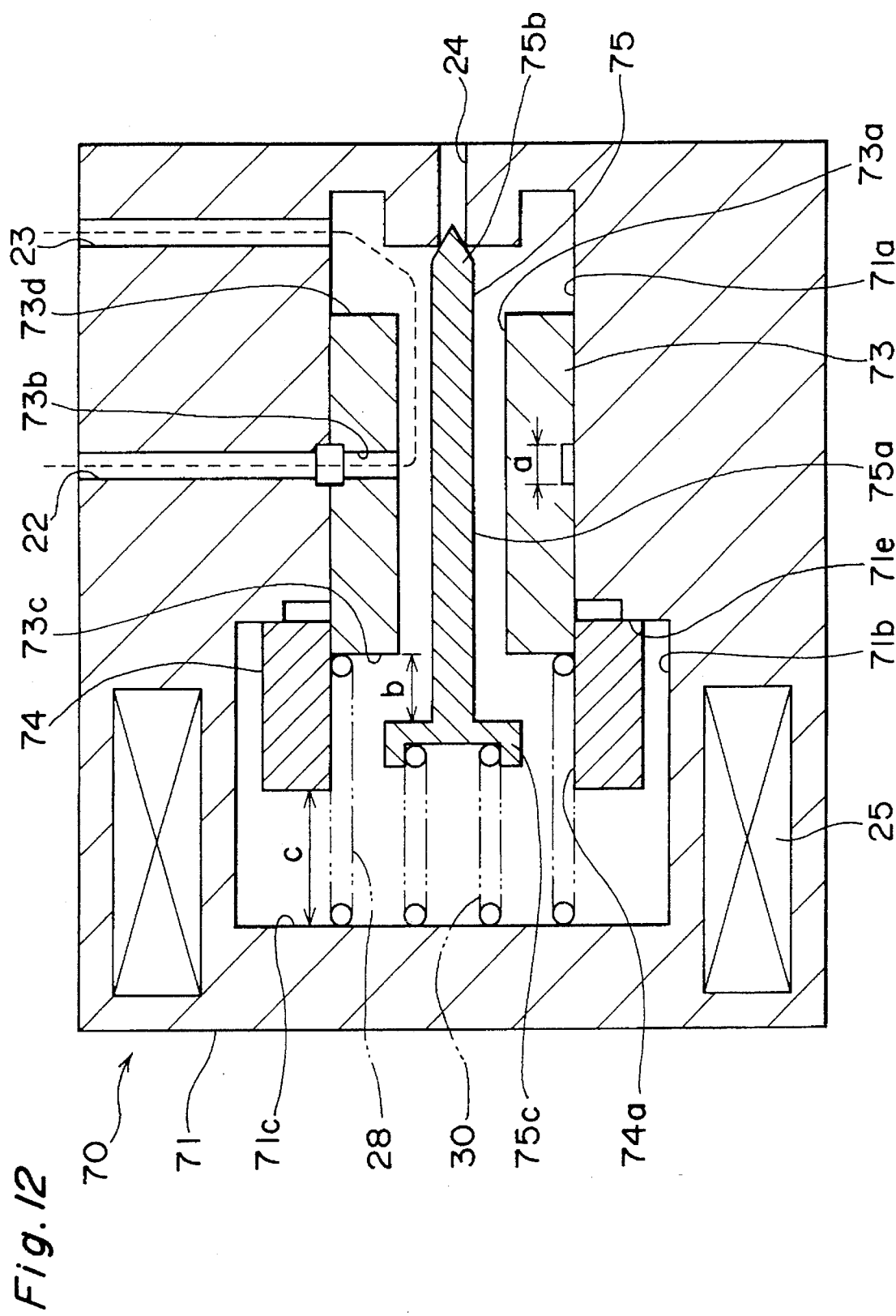
FIG. 12 is a schematic sectional view of a three position solenoid controlled valve according to a third embodiment of the present invention.
Figure 13:
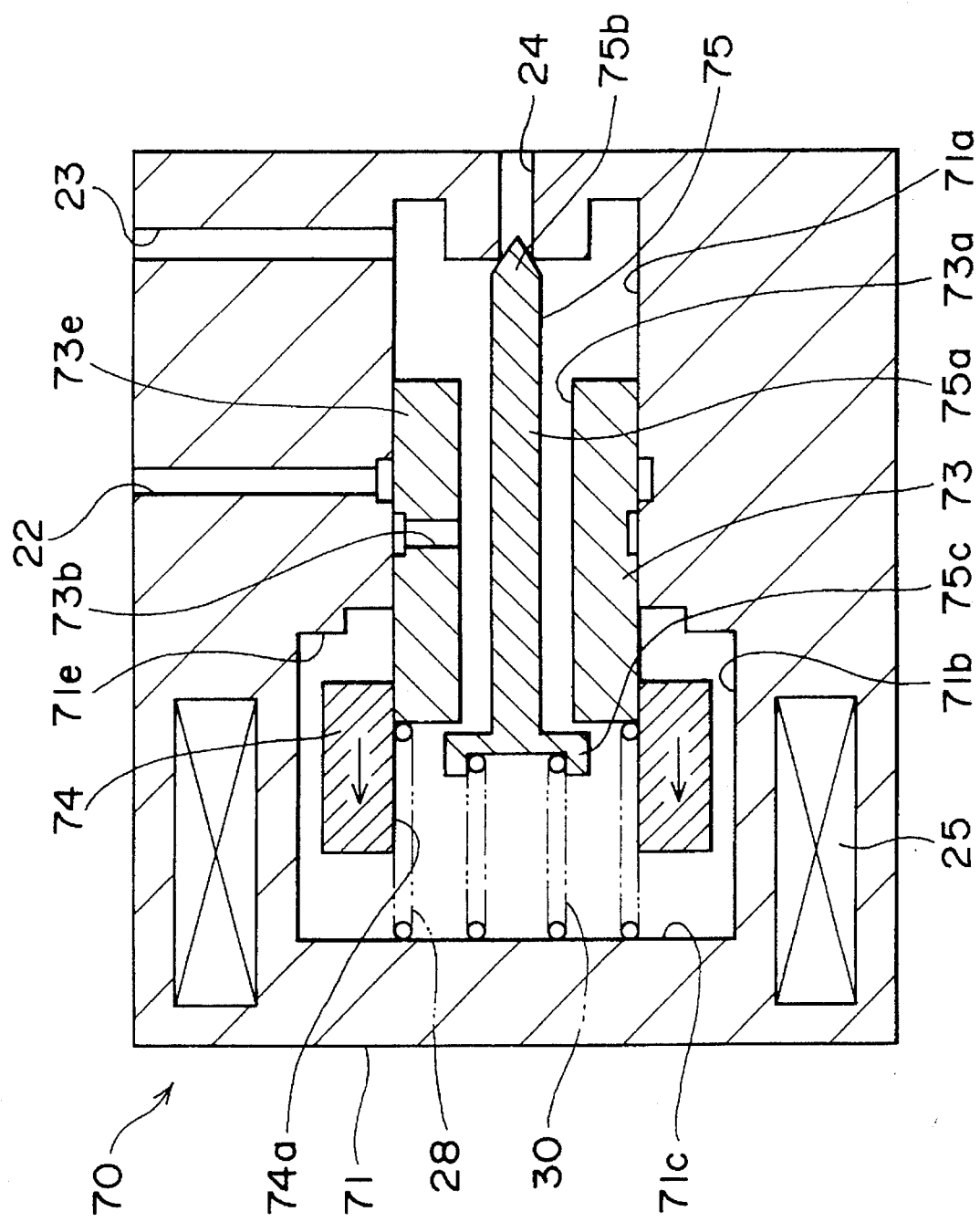
FIGS. 13 and 14 are schematic sectional views showing an intermediate energization state and a full energization state of the three position solenoid controlled valve of FIG. 12, respectively.
Figure 14:
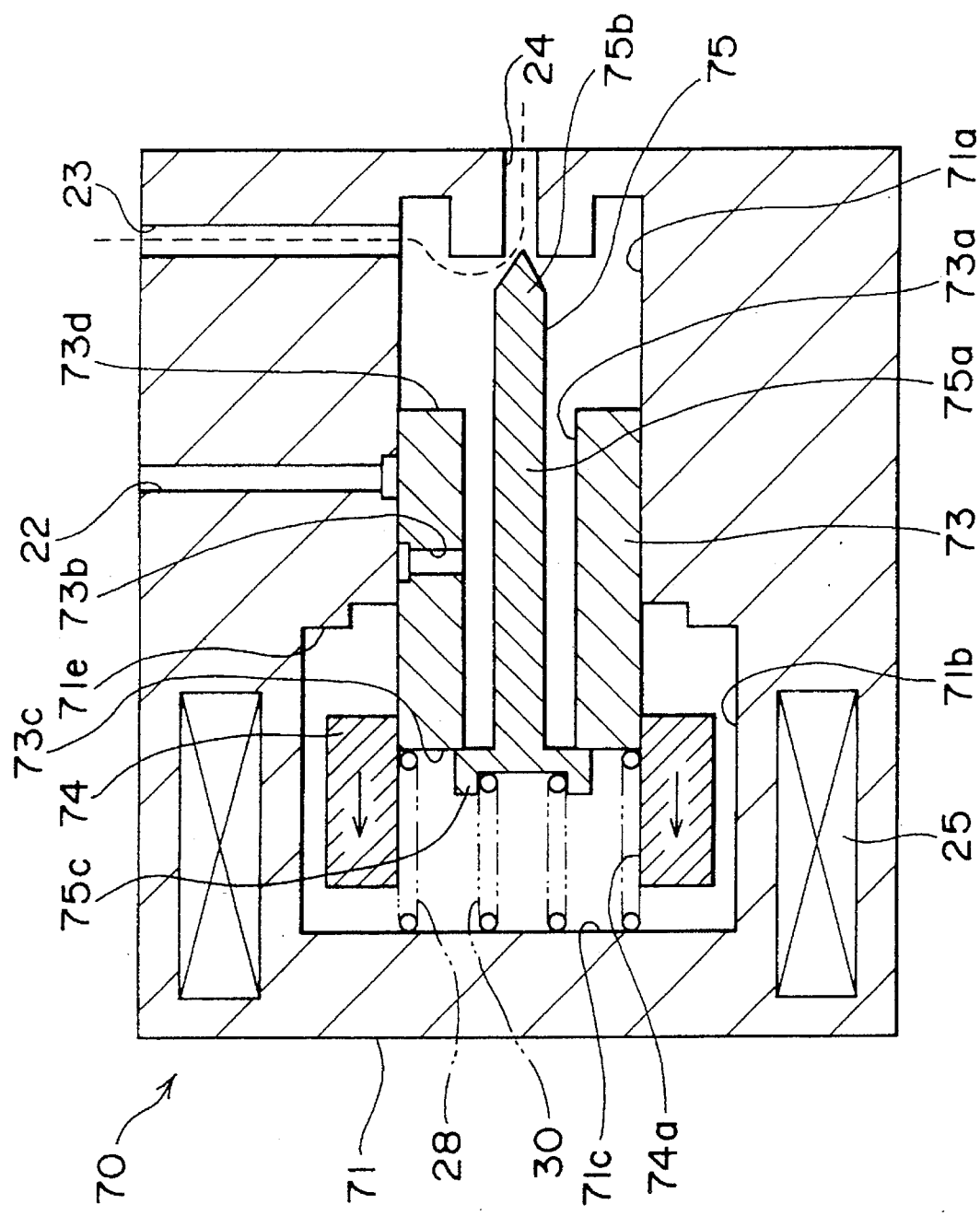

FIGS. 12 to 14 show a three position solenoid controlled valve 70 according to a third embodiment of the present invention. A first liquid chamber 71a and a second liquid chamber 71b having a diameter larger than that of the first liquid chamber 71a are formed on a housing 71 of the three position solenoid controlled valve 70 so as to axially extend in series. The housing 71 has the radially extending first and second ports 22 and 23 communicating with the first liquid chamber 71a and the axially extending third port 24 communicating with the first liquid chamber 71a.

A spool 73 is provided in the first liquid chamber 71a so as to be slidable substantially in liquid-tight state. A liquid passage 73a acting as a detour axially extends through the spool 73 and a passage 73b for communicating the liquid passage 73a with outer periphery of the spool 73 are formed on the spool 73. The first spring 28 is compressed between a left end face 73c of the spool 73 and an end face 71c of the second liquid chamber 71b. A left end portion of the spool 73 projects into the second liquid chamber 71b and a movable member 74 is fixed to the left end portion of the spool 73. The movable member 74 is formed into a short cylindrical shape and a liquid passage 74a axially extends through the movable member 74. By press fitting the spool 73 into the liquid passage 74a, the movable member 74 and the spool 73 are integrally secured to each other. Meanwhile, the electromagnetic urging means 25 including an electromagnet is provided so as to surround the second liquid chamber 71b.

A second valve body 75 has a long rod portion 75a which is loosely inserted into the liquid passage 73a of the spool 73 and the liquid passage 74a of the movable member 74. A conical portion 75b for closing the third port 24 is provided at one end of the rod portion 75a adjacent to the first liquid chamber 71a. Meanwhile, a spring support 75c is provided at the other end of the rod portion 75a adjacent to the second liquid chamber 71b such that the second spring 30 is compressed between the spring support 75c and the end face 71c of the second liquid chamber 71b. In the same manner as the first embodiment, dimensions of the components of the three position solenoid controlled valve 70 are set such that the travel stroke a of the spool 73 for closing the first port 22, the distance b for setting the second valve body 75 to inoperative state and the maximum travel stroke c of the movable member 74 satisfy the relation of (a<b<c).

Then, operation of the three position solenoid controlled valve 70 of the above described arrangement is described. Initially, when electromagnetic force is not applied to the movable member 74 without supplying electric current to the electromagnetic urging means 25, i.e., at the time of deenergization of the electromagnetic urging means 25, the movable member 74, the spool 73 integral with the movable member 74 and the second valve body 75 are disposed as shown in FIG. 12. Namely, at the time of deenergization of the electromagnetic urging means 25, since the spool 73 is urged rightwards by the first spring 28, the movable member 74 is brought into contact with a step portion 71e formed at a joint between the first and second liquid chambers 71a and 71b, so that the spool 73 is held at the position where the passage 73b is communicated with the first port 22. On the other hand, the second valve body 75 is urged rightwards by the second spring 30 such that the conical portion 75b closes the third port 24. Accordingly at the time of deenergization of the electromagnetic urging means 25, a flow path proceeding from the first port 22 to the second port 23 via the passage 73b, the liquid passage 73a and the first liquid chamber 71a is formed as shown by the broken line in FIG. 12.

Then, when an intermediate electromagnetic force is applied to the movable member 74 by the electromagnetic urging means 25 by supplying electric current to the electromagnetic urging means 25, i.e., at the time of intermediate energization of the electromagnetic urging means 25, the movable member 74, the spool 73 and the second valve body 75 are disposed as shown in FIG. 13. Namely, at the time of intermediate energization of the electromagnetic urging means 25, since leftward electromagnetic force is applied to the movable member 74 by the electromagnetic urging means 25, the movable member 74 and the spool 73 integral with the movable member 74 are displaced leftwards from the positions of FIG. 12. By this displacement of the spool 73, the first port 22 and the passage 73b are brought out of communication with each other and thus, the first port 22 is closed by a land portion 73e of the spool 73. On the other hand, the distance b for setting the second valve body 75 to inoperative state is set to be larger than the travel stroke a of the spool 73 for closing the first port 22 as described above. Therefore, even if the first port 22 is closed, the end face 73c of the spool 73 is held out of contact with the spring support 75c of the second valve body 75, so that the third port 24 is still closed by the second valve body 75.

Subsequently, when a large electromagnetic force is applied to the movable member 74 by the electromagnetic urging means 25 by supplying a large amount of electric current to the electromagnetic urging means 25, i.e., at the time of full energization of the electromagnetic urging means 25, the movable member 74, the spool 73 and the second valve body 75 are disposed as shown in FIG. 14. Namely, at the time of full energization of the electromagnetic urging means 25, the movable member 74 and the spool 73 are moved further leftwards than at the time of intermediate energization of the electromagnetic urging means 25, while the first port 22 is kept closed by the spool 73. Meanwhile, by this displacement of the movable member 74 and the spool 73, the end face 73c of the spool 73 and the spring support 75c of the second valve body 75 are brought into contact with each other, so that the second valve body 75 is displaced leftwards against urging force of the second spring 30. Hence, the conical portion 75b of the second valve body 75 is released from the third port 24 so as to open the third port 24. Therefore, at the time of full energization of the electromagnetic urging means 25, a flow path proceeding from the second port 23 to the third port 24 through the first liquid chamber 71a is formed as shown by the broken line in FIG. 14.

In the three position solenoid controlled valve 70, the liquid passage 73a axially extending through the spool 73 is formed on the spool 73. Therefore, at the time of deenergization of the electromagnetic urging means 25 as shown in FIG. 12, liquid pressures applied to opposite end faces 73c and 73d of the spool 73 from the first and second ports 22 and 23 eliminate each other and thus, axial force based on liquid pressure is not applied to the spool 73. Accordingly, in order to maintain the spool 73 at a predetermined position at the time of deenergization of the electromagnetic urging means 25, urging force of the first spring 28 may be set at such a small value as to overcome small sliding resistance produced during sliding of the spool 73.

Meanwhile, since the liquid passage 73a axially extending through the spool 73 is formed on the spool 73, liquid pressures applied to the opposite end faces 73c and 73d of the spool 73 eliminate each other also at the time of intermediate energization of the electromagnetic urging means 25. Therefore, a minimum electromagnetic force required for keeping the first and third ports 22 and 24 closed is equal to a sum of urging force of the first spring 28 and sliding resistance of the spool 73. On the other hand, a maximum electromagnetic force for keeping the first and third ports 22 and 24 closed is equal to a sum of urging forces of the first and second springs 28 and 30. However, since urging force of the first spring 28 is small as described above, difference between the maximum and minimum electromagnetic forces referred to above can be widened by setting urging force of the second spring 30 at a relatively large value. Thus, at the time of intermediate energization of the electromagnetic urging means 25 in the third embodiment, electromagnetic force for keeping the first and third ports 22 and 24 closed is small and range of this electromagnetic force can be set widely.

Meanwhile, at the time of full energization of the electromagnetic urging means 25 in the third embodiment, electromagnetic force is equal to a sum of urging forces of the first and second springs 28 and 30 and a maximum force based on liquid pressure applied to the second valve body 75. However, since urging force of the first spring 28 is small as described above, this electromagnetic force required at the time of full energization of the electromagnetic urging means 25 is relatively small.

In the same manner as FIG. 7 for the first embodiment, the three position solenoid controlled valve 70 can be applied to an antiskid control device by connecting the first, second and third ports 22, 23 and 24 with the master cylinder, the wheel cylinder and the return path, respectively. At this time, since the third port 24 is closed by pressing the second valve body 75 against the housing 71, working fluid does not leak from the third port 24 when a motor vehicle is not subjected to antiskid control. Meanwhile, working fluid may leak slightly through a sliding gap between the spool 73 and the housing 71 but this leakage occurs in a state where liquid pressure of the second port 23 connected with the wheel cylinder varies greatly under antiskid control. Therefore, when leakage of working fluid is reduced by minimizing the sliding gap between the spool 73 and the housing 71, leakage of working fluid does not pose any problem in practical use.

Furthermore, in the third embodiment, since the movable member 74 and the spool 73 are integrally fixed to each other, the movable member 74 and the spool 73 are axially displaced integrally during operation of the three position solenoid controlled valve 70, the three position solenoid controlled valve 70 is structurally made simpler than the three position solenoid controlled valves 20 and 60 of the first and second embodiments.

Figure 15:
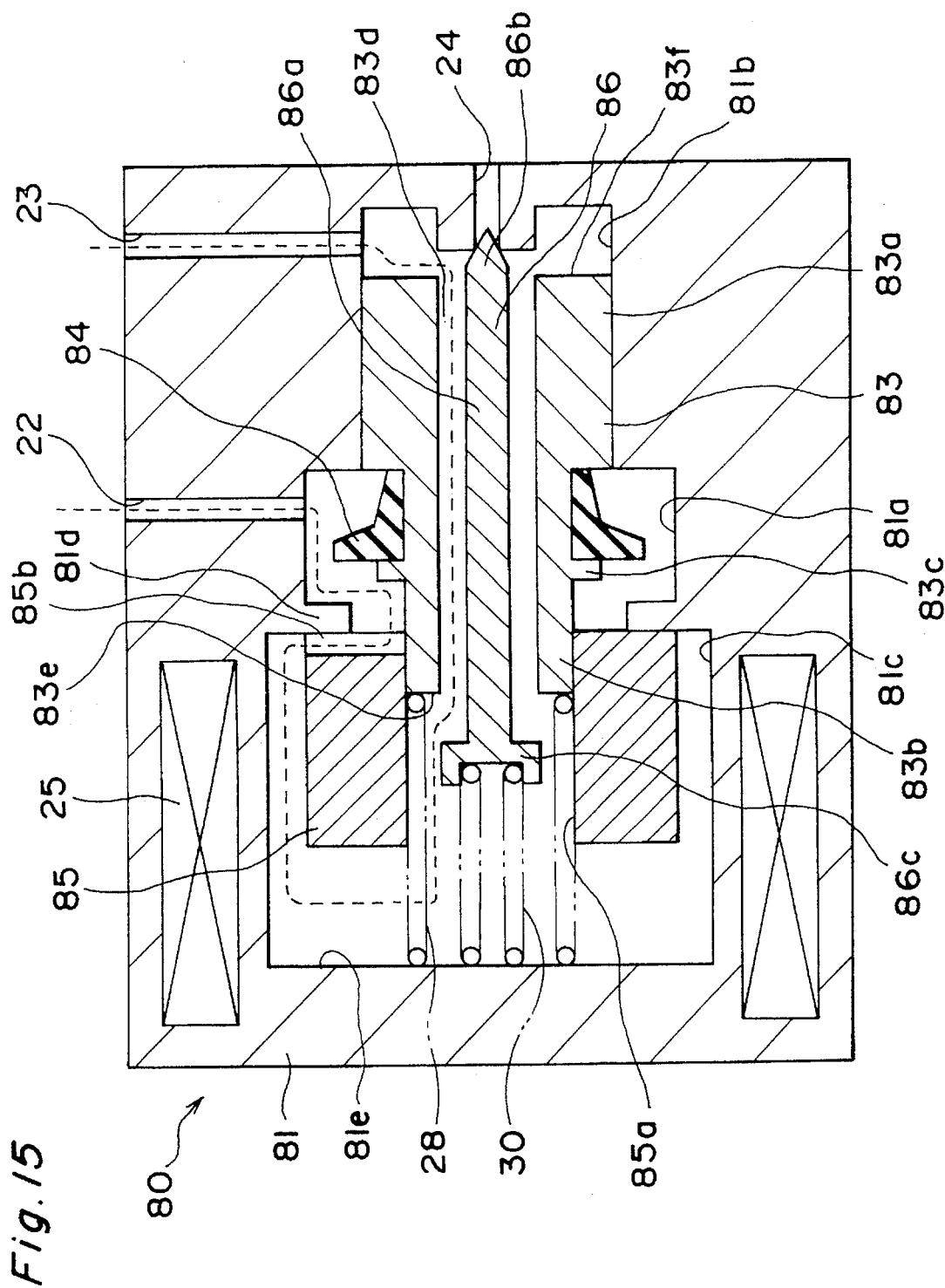
FIG. 15 is a schematic sectional view of a three position solenoid controlled valve according to a fourth embodiment of the present invention.
Figure 16:
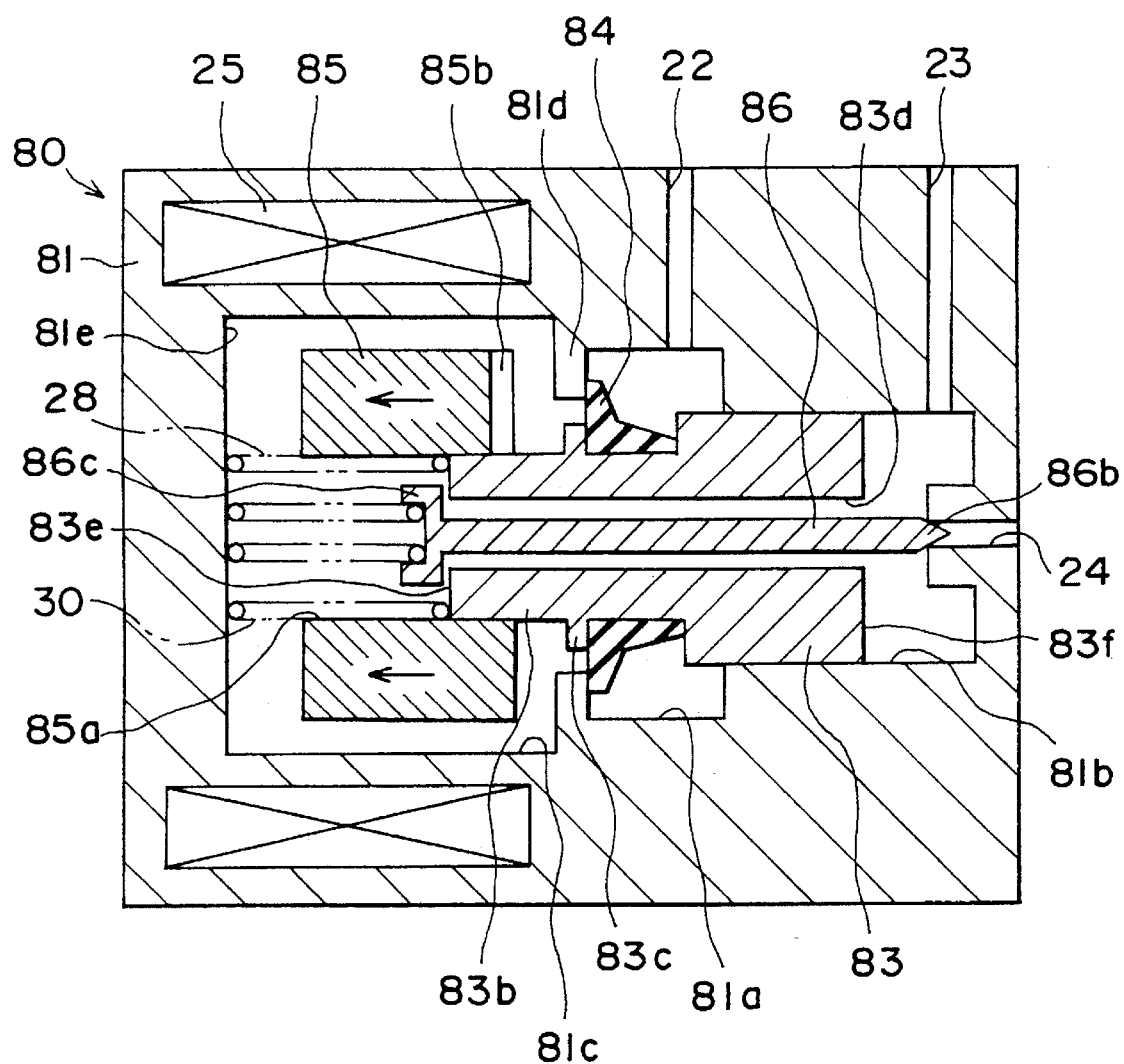
FIGS. 16 and 17 are schematic sectional views showing an intermediate energization state and a full energization state of the three position solenoid controlled valve of FIG. 15, respectively. Before the description of the present invention proceeds, it is to be noted that like parts are designated by like reference numerals throughout several views of the accompanying drawings.
Figure 17:
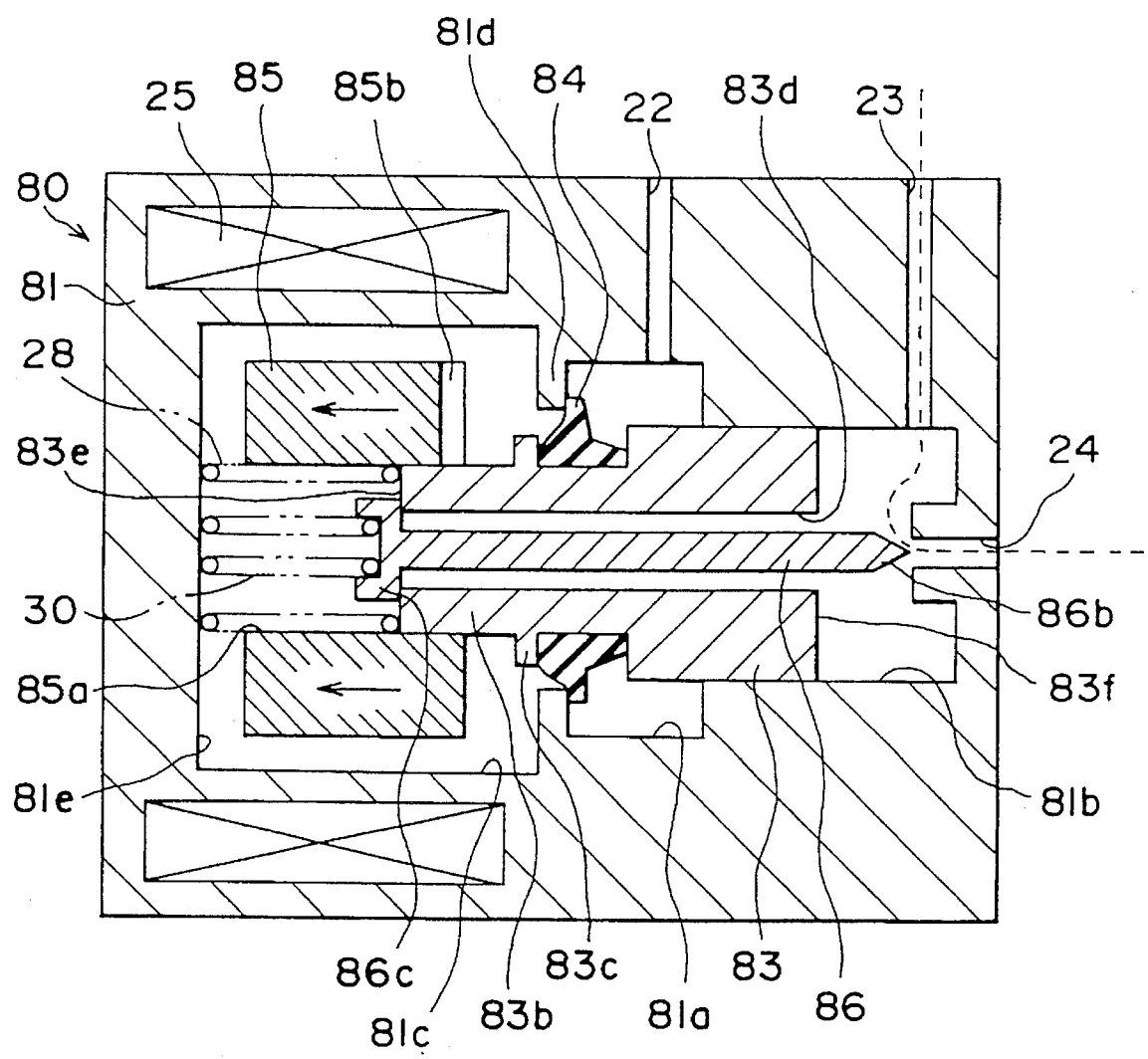

FIGS. 15 to 17 show a three position solenoid controlled valve 80 according to a fourth embodiment of the present invention. A housing 81 of the three position solenoid controlled valve 80 is formed with a first liquid chamber 81a. A second liquid chamber 81b and a third liquid chamber 81c are, respectively, formed at opposite ends of the first liquid chamber 81a so as to extend axially in series. A radially inwardly extending seat portion 81d is provided between the first and third liquid chambers 81a and 81c. Meanwhile, the housing 81 has the radially extending first port 22 communicating with the first liquid chamber 81a, the radially extending second port 23 communicating with the second liquid chamber 81b and the axially extending third port 24 communicating with the second liquid chamber 81b.

A spool 83 includes a large-diameter portion 83a, a small-diameter portion 83b and a flange portion 83c and a liquid passage 83 axially extends through the spool 83. The large-diameter portion 83a is brought into sliding contact with peripheral surface of the second liquid chamber 81b, while the small-diameter portion 83b and the flange portion 83c are loosely inserted into the first and third liquid chambers 81a and 81c. An elastic annular sealing member 84 is fitted around the small-diameter portion 83b so as to be axially retained between the flange portion 83c and the large-diameter portion 83a. The first spring 28 is compressed between a left end face 83e of the spool 83 and a left end face 81e of the third liquid chamber 81c.

Furthermore, in the same manner as the third embodiment, a movable member 85 having a short cylindrical shape and formed with a liquid passage 85a axially extending therethrough is fixed to a left end portion of the spool 83, which extends into the third liquid chamber 81c. A detour 85b is formed on the movable member 85 by radially recessing periphery of the movable member 85 partially. The electromagnetic urging means 25 including an electromagnet is provided so as to surround the third liquid chamber 81c.

In the same manner as the third embodiment, a second valve body 86 has a long rod portion 86a which is loosely inserted into the liquid passage 83d of the spool 83 and the liquid passage 85a of the movable member 85. A conical portion 86b for closing the third port 24 is provided at one end of the rod portion 86a adjacent to the second liquid chamber 81b. Meanwhile, a spring support 86c is provided at the other end of the rod portion 86a adjacent to the third liquid chamber 81c such that the second spring 30 is compressed between the spring support 86c and the end face 81e of the third liquid chamber 81c.

Then, operation of the three position solenoid controlled valve 80 of the above described arrangement is described. Initially, at the time of deenergization of the electromagnetic urging means 25, the spool 83 is disposed as shown in FIG. 15. Thus, the elastic sealing member 84 is held out of contact with the seat portion 81d and a flow path proceeding from the first port 22 to the second port 23 via the first liquid chamber 81a, the detour 85b, the third liquid chamber 81c, the liquid passages 85a and 83d and the second liquid chamber 81b is formed as shown by the broken line in FIG. 15.

At the time of intermediate energization of the electromagnetic urging means 25, the movable member 85 subjected to electromagnetic force from the electromagnetic urging means 25 and the spool 83 integral with the movable member 85 are displaced leftwards as shown in FIG. 16. Thus, the elastic sealing member 84 is pressed against the seat portion 81d so as to cut off communication between the first and third liquid chambers 81a and 81c. Therefore, at the time of intermediate energization of the electromagnetic urging means 25, the first port 22 is intercepted from the second and third ports 23 and 24, while the third port 24 is closed by the second valve body 86.

At the time of full energization of the electromagnetic urging means 25, the movable member 85 and the spool 83 are displaced further leftwards as shown in FIG. 17 while the annular sealing member 84 pressed against the seat portion 81d is being deflected. At this time, the first port 22 is kept closed. Meanwhile, since the end face 83e of the spool 83 is brought into contact with the spring support 86c of the second valve body 86, the second valve body 86 is also displaced leftwards together with the movable member 85 and the spool 83 so as to open the third port 24. Accordingly, at the time of full energization of the electromagnetic urging means 25, the second and third ports 23 and 24 are communicated with each other through the second liquid chamber 81b as shown by the broken line in FIG. 17.

In the same manner as the first to third embodiments, since liquid pressures applied to opposite end faces 83e and 83f of the spool 83 eliminate each other at all times also in the three position solenoid controlled valve 80, urging force of the first spring 28 can be set at a small value. Therefore, intermediate energization state and full energization state of the electromagnetic urging means 25 can be maintained by relatively small electromagnetic force. Range of electric current for obtaining intermediate energization state of the electromagnetic urging means 25 is also relative wide.

Meanwhile, in the three position solenoid controlled valve 80, since the first and second ports 22 and 23 are intercepted from each other by bringing the sealing member 84 into contact with the seat portion 81d, leakage of working fluid at the time of intermediate energization or full energization of the electromagnetic urging means 25 takes place only through a relatively long sliding gap between the spool 83 and the housing 81 and thus, can be lessened even if components of the three position solenoid controlled valve 80 are machined at low precision.

Furthermore, in the fourth embodiment, since the movable member 85 and the spool 83 are integrally secured to each other as described above, the movable member 85 and the spool 83 are axially displaced integrally and thus, the three position solenoid controlled valve 80 is structurally made simpler than the three position solenoid controlled valve 20 and 60 of the first and second embodiments.

Meanwhile, when the three position solenoid controlled valves 20 to 80 of the first to fourth embodiments are applied to an antiskid control device, the first port 22 is connected with the master cylinder and the third port 24 is connected with the return path. However, the first and third ports 22 and 24 may also be, respectively, connected with the return path and the master cylinder reversely. In this case, if urging force of the second spring 30 is set so as to prevent the second valve body from opening the third port 24 spontaneously due to pressure from the master cylinder, antiskid control can be performed by setting deenergization state, intermediate energization state and full energization state of the electromagnetic urging means 25 to a depressurizing mode, a holding mode and a pressurizing mode, respectively.

In the three position solenoid controlled valve of the first and second embodiments, since the detour for allowing communication of working fluid between the opposite ends of the first valve body in the sliding direction of the first valve body is formed on the first valve body or the movable member, the force based on the liquid pressure applied to one of the opposite ends of the first valve body in the sliding direction of the first valve body from the first and second ports and the force based on the liquid pressure applied to the other of the opposite ends of the first valve body in the sliding direction of the first valve body from the first and second ports eliminate each other regardless of position of the movable member in the housing. Therefore, intermediate energization and full energization of the electromagnetic urging means can be performed by a relatively small electromagnetic force and thus, amount of electric current supplied to the electromagnetic urging means can be reduced. As a result, the electromagnetic urging means is not required to be made larger in size, so that the three position solenoid controlled valve as a whole can be made compact and can be produced at low cost.

Meanwhile, in the first and second embodiments, since full energization of the electromagnetic urging means by the relatively small electromagnetic force as described above, range of value of electric current for maintaining this intermediate energization of the electromagnetic urging means is relatively wide and thus, control accuracy of electric current supplied to the electromagnetic urging means can be lowered sharply.

Furthermore, in the instant invention, as disclosed in the first embodiment, since the first and second ports are brought out of communication with each other through relative displacement between the housing and the land portion of the first valve body formed by the spool, leakage of working fluid at the time of deenergization of the electromagnetic urging means offers substantially no problem for practical use in the case where the three position solenoid controlled valve is applied to an antiskid control device, etc.

In the second embodiment of the present invention, since the annular sealing member is brought into contact with the seat portion provided on the first valve body or the housing so as to bring the first and second ports out of communication with each other when the first valve body is displaced. Thus, leakage of working fluid between the first and second ports can be reduced greatly.

In the three position solenoid controlled valve, the second urging means is provided between the first and second valve bodies. Accordingly, the three position solenoid controlled valve can be assembled by sequentially fitting the second valve body, the first valve body, the movable member, etc. into the housing, so that the three position solenoid controlled valve can be assembled easily.

In the three position solenoid controlled valve of the instant invention, the force based on the liquid pressure applied to one of the opposite ends of the first valve body in the sliding direction of the first valve body from the first and second ports and the force based on the liquid pressure applied to the other of the opposite ends of the first valve body in the sliding direction of the first valve body from the first and second ports eliminate each other regardless of position of the movable member in the housing. Therefore, intermediate energization and full energization of the electromagnetic urging means can be performed by a relatively small electromagnetic force and thus, amount of electric current supplied to the electromagnetic urging means can be reduced. Meanwhile, since intermediate energization of the electromagnetic urging means can be performed by the relatively small electromagnetic force as described above, range of value of electric current for maintaining this intermediate energization of the electromagnetic urging means is wide. Furthermore, since the first valve body and the movable member are provided integrally with each other, the three position solenoid controlled valve is simplified structurally.

In addition, since the first and second ports are brought out of communication with each other through relative displacement between the housing and the land portion of the first valve body formed by the spool, leakage of working fluid at the time of deenergization of the electromagnetic urging means poses substantially no problem for practical use in the case where the three position solenoid controlled valve is applied to an antiskid control device, etc.

Further, since the annular sealing member is brought into contact with the seat portion provided on the first valve body or the housing so as to bring the first and second ports out of communication with each other when the first valve body is displaced, leakage of working fluid between the first and second ports can be reduced greatly.

What is claimed is:

1. A three position solenoid controlled valve, comprising:

a housing having a first port, a second port and a third port;

a first valve body for selectively bringing said first port and said second port into communication with each other;

first urging means for urging said first valve body in a direction that brings said first port and said second port into communication with each other;

a second valve body for selectively bringing said second port and said third port into communication with each other;

second urging means for urging said second valve body in a direction that brings said second port and said third port out of communication with each other;

a movable member; and electromagnetic urging means for imparting an electromagnetic force to said movable member;

wherein an urging force of said first urging means causes said first valve body to bring said first port and said second port into communication with each other and an urging force of said second urging means causes said second valve body to bring said second port and said third port out of communication with each other, when said electromagnetic force of said electromagnetic urging means is zero;

wherein said movable member causes said first valve body to bring said first port and said second port out of communication with each other against said urging force of said first urging means and said urging force of said second urging means causes said second valve body to bring said second port and said third port out of communication with each other, when said electromagnetic force of said electromagnetic urging means is set to a first predetermined value;

wherein said movable member causes said first valve body and said second valve body to bring said first port and said second port out of communication with each other against said urging force of said first urging means, and said second port and said third port into communication with each other against said urging force of said second urging means, when said electromagnetic force of said electromagnetic urging means is set to a second predetermined value that is larger than said first predetermined value;

one of said first valve body and said movable member being formed with a detour that allows communication of working fluid between opposite ends of said first valve body in a sliding direction of said first valve body, regardless of a position of said movable member, such that a liquid pressure force applied to one of said opposite ends of said first valve body in said sliding direction of said first valve body from said first port to said second port and a liquid pressure force applied to another of said opposite ends of said first valve body in said sliding direction of said first valve body from said first port to said second port cancel each other;

wherein said first valve body and said movable member are provided integrally with each other.

2. The three position solenoid controlled valve of claim 1, wherein said first valve body comprises a spool slidable within said housing in a substantially liquid-tight state which brings said first port and said second port out of communication with each other through relative displacement between said housing and a land portion of said first valve body.

3. The three position solenoid controlled valve of claim 1, further comprising:

an annular sealing member provided on one of said first valve body and said housing;

wherein said first valve body is formed by a spool slidable within said housing;

wherein said annular sealing member is brought into contact with a seat portion provided on one of said first valve body and said housing so as to bring said first port and said second port out of communication with each other when said first valve body is displaced in a direction maximizing a relative displacement between said housing and a land portion of said first valve body.

4. The three position solenoid controlled valve of claim 3, wherein said annular sealing member is made of an elastic material.

5. The three position solenoid controlled valve of claim 1, wherein said first valve body moves relative to said second valve body when said electromagnetic force of said electromagnetic force imparting means is set to said first predetermined value.

6. The three position solenoid controlled valve of claim 1, wherein said movable member contacts said second valve body, forcing said second valve body to open when said electromagnetic force of said electromagnetic force imparting means is set to said second predetermined value.

7. A three position solenoid controlled valve, comprising:

a housing, said housing having a first port, a second port and a third port;

a first valve body that selectively brings said first port into communication with said second port;

first means for urging said first valve body in a direction that brings said first port into communication with said second port;

a second valve body that selectively brings said second port into communication with said third port;

second means for urging said second valve body in a direction that brings said second port out of communication with said third port;

a movable member; and means for imparting an electromagnetic force to said movable member, wherein one of said first valve body and said movable member is formed with a detour that allows a communication of working fluid between opposite ends of said first valve body in a sliding direction of said first valve body, regardless of a position of said movable member.

8. The three position solenoid controlled valve of claim 7, wherein said first valve body moves relative to said second valve body when said electromagnetic force of said electromagnetic force imparting means is set to a predetermined value.

9. The three position solenoid controlled valve of claim 7, wherein said movable member contacts said second valve body, forcing said second valve body to open when said electromagnetic force of said electromagnetic force imparting means is set to a predetermined value.

10. The three position solenoid controlled valve of claim 7, wherein a liquid pressure force applied to one of said opposite ends of said first valve body and a liquid pressure force applied to another of said opposite ends of said first valve body cancel each other.

11. The three position solenoid controlled valve of claim 7, wherein said first port is in communication with said second port and said second port is out of communication with said third port when said electromagnetic force of said electromagnetic force imparting means is zero, said first port being out of communication with said second port and said second port being out of communication with said third port when said electromagnetic force of said electromagnetic force imparting means is set to a first predetermined value, while said first port is out of communication with said second port and said second port is in communication with said third port when said electromagnetic force of said electromagnetic force imparting means is set to a second predetermined value that is larger than said first predetermined value.

12. The three position solenoid controlled valve of claim 7, wherein said first valve body comprises a spool slidable within said housing that brings said first port out of communication with said second port through a relative displacement of said spool between said housing and a land portion of said first valve body.

13. The three position solenoid controlled valve of claim 7, further comprising:

a sealing member provided on one of said first valve body and said housing, wherein said first valve body is formed by a spool slidable within said housing, said sealing member being brought into contact with a seat portion provided on one of said first valve body and said housing so as to bring said first port out of communication with said second port when said first valve body is displaced in a direction for maximizing a relative displacement between said housing and a land portion of said first valve body.

14. The three position solenoid controlled valve of claim 13, wherein said sealing member comprises an annular sealing member.

15. The three position solenoid controlled valve of claim 13, wherein said sealing member comprises an elastic sealing member.

16. A three position solenoid controlled valve, comprising:

a housing, said housing having a first port, a second port and a third port;

a spool that selectively brings said first port into communication with said second port, said spool being slidable within said housing in a substantially liquid-tight state and bringing said first port out of communication with said second port through a relative displacement between said housing and a land portion of said spool;

first means for urging said spool in a direction that brings said first port into communication with said second port;

a valve body that selectively brings said second port into communication with said third port;

second means for urging said valve body in a direction that brings said second port out of communication with said third port;

a movable member; and means for imparting a force to said movable member, wherein said first port is in communication with said second port and said second port is out of communication with said third port when said force of said force imparting means is zero, said first port being out of communication with said second port and said second port being out of communication with said third port when said force of said force imparting means is set to a first predetermined value, while said first port is out of communication with said second port and said second port is in communication with said third port when said force of said force imparting means is set to a second predetermined value that is larger than said first predetermined value, one of said spool and said movable member being formed with a detour that allows a communication of working fluid between opposite ends of said spool regardless of a position of said movable member, such that forces applied to said opposite ends of said spool cancel each other.

17. The three position solenoid controlled valve of claim 16, further comprising:

a sealing member provided on one of said spool and said housing, wherein said sealing member is brought into contact with a seat portion provided on one of said spool and said housing, so as to bring said first port out of communication with said second port when said spool is displaced in a direction maximizing a relative displacement between said housing and a land portion of said spool.

18. The three position solenoid controlled valve of claim 17, wherein said sealing member comprises an elastic annular sealing member.

19. The three position solenoid controlled valve of claim 16, wherein said spool moves relative to said valve body when said force of said force imparting means is set to said first predetermined value.

20. The three position solenoid controlled valve of claim 16, wherein said movable member contacts said valve body, forcing said valve body to open when said force of said force imparting means is set to said second predetermined value.

* * * * *